United States Patent
Czaja et al.

(10) Patent No.: US 9,674,759 B2
(45) Date of Patent: Jun. 6, 2017

(54) INTEGRATING MOBILE FEMTO-CELL ACCESS POINT INTO HOME APPLIANCE NETWORK

(71) Applicant: IPComm LLC, Cardiff, CA (US)

(72) Inventors: Stanislaw Czaja, Cardiff, CA (US); Muhammad Afsar, San Diego, CA (US)

(73) Assignee: IPCOMM, Cardiff, CA (US)

( * ) Notice: Subject to any disclaimer, the term of this patent is extended or adjusted under 35 U.S.C. 154(b) by 194 days.

(21) Appl. No.: 14/751,545

(22) Filed: Jun. 26, 2015

(65) Prior Publication Data

US 2016/0021595 A1  Jan. 21, 2016

Related U.S. Application Data

(63) Continuation-in-part of application No. 14/336,147, filed on Jul. 21, 2014.

(51) Int. Cl.
| | | |
|---|---|---|
| H04W 36/32 | (2009.01) | |
| H04W 4/04 | (2009.01) | |
| H04W 36/00 | (2009.01) | |
| H04W 84/10 | (2009.01) | |
| H04W 84/00 | (2009.01) | |
| H04W 84/04 | (2009.01) | |

(52) U.S. Cl.
CPC ........... *H04W 36/32* (2013.01); *H04W 4/046* (2013.01); *H04W 36/0055* (2013.01); *H04W 84/005* (2013.01); *H04W 84/045* (2013.01); *H04W 84/10* (2013.01)

(58) Field of Classification Search
CPC ........... H04M 11/045; H04M 1/72577; H04M 11/04; H04W 72/04; H04W 36/32; H04W 4/046; H04W 36/0055; H04W 84/005; H04W 84/045; H04W 84/10; H04W 4/04; H04W 36/005; H04W 64/00–64/006
See application file for complete search history.

(56) References Cited

U.S. PATENT DOCUMENTS

| | | | | |
|---|---|---|---|---|
| 6,973,057 | B1* | 12/2005 | Forslow | H04L 45/50 370/328 |
| 9,144,107 | B2* | 9/2015 | Dravida | H04W 60/00 |
| 2004/0004948 | A1* | 1/2004 | Fletcher | H04W 88/08 370/338 |
| 2005/0014497 | A1* | 1/2005 | Goren | H04W 64/00 455/423 |
| 2005/0152305 | A1* | 7/2005 | Ji | H04L 45/54 370/328 |
| 2007/0010248 | A1* | 1/2007 | Dravida | H04W 60/00 455/435.1 |
| 2010/0046406 | A1* | 2/2010 | Annamalai | H04W 64/00 370/310 |
| 2011/0014929 | A1* | 1/2011 | Moshfeghi | H04W 4/02 455/456.3 |
| 2013/0285855 | A1* | 10/2013 | Dupray | G01S 19/48 342/451 |

(Continued)

*Primary Examiner* — Mehmood B Khan

(57) ABSTRACT

A system including vehicle based mobile femto-cell Access Point (mAP) operating within a wireless cellular network in communication with the home based femto-cell Access Point (hAP) and a home appliance network (hAN) controller is described. This system provides an autonomous control of "smart-home" functionality by utilizing handovers and a set of dedicated in-band messages.

8 Claims, 16 Drawing Sheets

(56) References Cited

U.S. PATENT DOCUMENTS

| | | | |
|---|---|---|---|
| 2015/0230056 A1* | 8/2015 | Shin .................. | G01C 21/36 455/420 |
| 2016/0086391 A1* | 3/2016 | Ricci ................. | G07C 5/008 701/29.3 |

* cited by examiner $$SINR = \frac{S}{I+N}$$

INTEGRATING MOBILE FEMTO-CELL ACCESS POINT INTO HOME APPLIANCE NETWORK

PRIORITY INFORMATION

This application is a Continuation in Part of a non-provisional application Ser. No. 14/336,147 titled "Wireless Social and Safety Network" filled Jul. 21, 2014, which was a Divisional application Ser. No. 13/039,477 titled "Mobile Femto-cell in Wireless Safety Network" filed on Mar. 3, 2011 now U.S. Pat. No. 9,031,605, which claims benefit of priority of a Provisional Application Ser. No. 61/310,553 titled "Femto-cell Handoffs and a Method for Controlling Student Security Networks, Green-home Functionality, Home Health Delivery and Enterprise Traffic Routing" filed Mar. 4, 2010, which are hereby incorporated by reference in its entirety as though fully and completely set forth herein.

FIELD OF THE INVENTION

The following disclosure relates generally to wireless communication, and more specifically integrating the wireless mobile access point (mAP) with the home Appliance Network (hAN) by utilizing the handovers between the user and the mAP and providing dedicated in-band messaging between the mAP and the macro-cell. Such system may be used to provide bundled (general and specifically targeted), efficient communication services targeted to the users located inside a moving vehicle, as well as provide triggers for other devices connected to the internet and/or macro-cellular system. Such system may be installed in public or fleet (school busses) transportation or a passenger car, to provide efficient integration of the smart-home, with a mobile user, by allowing automatic control of home appliance network utilizing and in-band messaging.

BACKGROUND

Wireless communication systems are widely deployed to provide various types of communication content such as voice, data, and so on. Such wireless communication system provides simultaneous support for multiple wireless terminals communicating with one or more base stations. Examples of such multiple-access systems include code division multiple access (CDMA) systems, time division multiple access (TDMA) systems, frequency division multiple access (FDMA) systems, and orthogonal frequency division multiple access (OFDMA) systems.

In addition to wireless networks currently in place, a new class of small, stationary base stations generally known as femto-cells, or femto-call access point (FAP), or home node B (hAPs), or home-evolved eNode B units (HeNBs) has emerged.

Femto-call access point base station transmit signal at low power levels and is intended for personal use to enhance indoor/outdoor coverage and quality of service (QoS) within the private home, public or corporate premises.

A typical FAP has two main interfaces: 1) wireless interface in the licensed part of the spectrum (cellular) to provide local service within the home; 2) fixed, wire (DSL, Cable, etc) interface to the service provider network over Internet.

Another form femto-cell may take a mobile form—mobile access point (mAP), which differs significantly form it's stationary version by: a) the secondary interface is wireless operating in the licensed spectrum; b) such secondary radio frequency (RF) interface must maintain time synchronization with the cellular network while the mAP is in motion; c) such secondary RF interface must support "smooth" transition of services for all users inside the vehicle, while the vehicle travels through the cellular network.

The functionality of said secondary RF interface may be further appreciated as it may provide additional benefits to the wireless cellular network by the ability to aggregate all of the user communication into a single multi-user packets transmitted on a single shared (between multiplicity of users) channel. Such transmission of multi-user packets is usually possible only on the down-link (macro-cell to terminal) communication channel, but in case of mAP, such multi-user packet transmission is possible also on the up-link (terminal to macro-cell) communication channel—as the presence of all users within time synchronized period is guarantee by the mAP. While lowering the network costs, such mAP functionality significantly increases cellular system capacity and throughput.

Home based femto-cell (hFAP) may employ a third, local or personal wireless interface (LAN or PAN respectively) such as: WiFi, ZigBee, Bluetooth, etc. for the purpose of integrating the home appliance network (smart-home) with the macro-cellular infrastructure. In such architecture the FAP becomes a Controlling Node of the home appliance network.

The techniques described herein can be used for various wireless communication systems such as code division multiple access (CDMA), time division multiple access (TDMA), frequency division multiple access (FDMA), orthogonal FDMA (OFDMA), SC-FDMA (single carrier FDMA) and other systems. The terms "system" and "network" are often used interchangeably. A CDMA system can implement a radio technology such as Universal Terrestrial Radio Access (UTRA), CDMA2000, etc. A TDMA system can implement a radio technology such as Global System for Mobile Communications (GSM). An OFDMA system can implement a radio technology such as Evolved UTRA (E-UTRA), IEEE 802.16 (WiMAX), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one embodiment, the present invention provides wireless safety network based on the concept of mobile femto-cell access point (mAP), integrated with the macro-cellular network and one or more conventional home femto-cells hAP. Such system provides for the management of students safety during their travel to/from school by integrating mAP into school busses and integrating such mAPs with the central control system residing in the femto-cell gateway hAP located in the school, a wireless cellular network, and one or more home based femto-cells hAP. By using handover mechanism integral to the cellular system such network provides virtual supervision of the student passage between his/her home and the school. In addition, such system maintains students class schedules, their presence/absence in classes, provides travel/class schedule alerts, emergency functions as well as providing restricted services during the class by blocking all incoming and outgoing calls—except emergency call to the student population wireless terminals in attempt to provide quiet and uninterrupted learning experience.

While the conventional FAP is connected to the Internet and subsequently to the wireless service provider over the fixed network (DSL, Cable), the mAP is connected to wireless service provider over the second wireless link. This second wireless link may be a different RF channel of the same technology as one serving the primary access interface or by another wireless technology. Beside providing dedicated services to mobile users (trains, busses, etc) mAP increase the macro-cell capacity quality of service (QoS) by aggregating traffic of multiple local users into multi-user packets does increasing in coding gain, avoiding allocation of multiple channels in CDMA systems, or avoiding fragmentation of transmission resources in OFDMA systems, as well as avoiding collisions in the uplink transmission.

In addition to mAP the wireless safety network comprises of one or more hAP, one of them home Gateway (hAP-GW), preferably located at the school premises performs and the Control Node Entity. The Control Node Entity performs mobility management function, and may be co-located with the hAP-GW or reside on a separate HW platform.

In one embodiment the wireless safety network may be use to provide student's safety during daily travel to/from school. In such embodiment, the mAP is installed in the school bus to supervise the presence of the student terminals included in it's mobile Closed Subscriber Group (mCSG) list in the mAP local coverage area. The mCSG is maintained by the Control Node entity. When the terminal associated with the mCSG performs HO from the macro-cell to the mAP, the mAP sends a Status Update Message to the Control Node entity with the student ID attendance indicator. In addition, mAP provides wireless services to the terminals associated with it's mCSG list and being within it's coverage area over it's wireless backhaul.

In such application, the Control Node entity maintains the list of all students, their class schedules, home addresses, bus routes schedules and IP addresses of the Remote Nodes (student's home femto-cell or wireless terminal) and student's wireless terminals IDs. Based on such information, Control Node entity populates the mCSG lists for each mAP.

The mCSG list is maintained by the mobility management (MM) function located in Control Node entity, which updates the mAP mCSG list with the IDs of the wireless terminals associated with this mAP route. In addition to student terminal ID, the mCSG list is populated with the mAP route stop number and location, or time, this particular terminal is expected to perform handover (HO) from the macro-cell to the mAP.

During the mAP scheduled route, the Control Node entity sends Alert Message to the student's Remote Node, reminding about the school bus arrival time. In response to the Alert Message, the Remote Node sends a Status Update Message indicating student current status. In response to receiving such status, the Control Node entity updates it's status registry and the status registry of the related mCSG.

When the student wireless terminal performs HO from the hAP to the macro-cell, the Remote Node sends a Status Update Message indicating that the student left it's coverage area. In response to receiving such status, the Control Node entity updates it's status registry and the status registry of the related mCSG.

After bus arrives at the school, each student's wireless terminal performs HO from mAP to the Control Node entity (this HO may be direct from the mAP to the school hAP-GW, or indirectly through the HO to macro-call and then to the school hAP). In response to such HOs, the Control Node entity updates it's registry and sends Status Update Message to each Remote Node indicating student's safe arrival.

In case, any of the scheduled HOs (home to macro; macro to mAP; mAP to school), does not occur, the Control Node entity enters the Alarm State, in which it performs notification procedures according to the student individual settings. Such procedures may involve one or all of the following: sending of the Alert Message to the student hAP in response to which this hAP performs set of preprogrammed emergency steps, or sending a SMS alert messages to the student's parent wireless terminal, or initiate E911 procedure.

Another embodiment of the present invention, integrates mAP with the home appliance network (hAN), providing autonomous control of "smart-home" functions. This integration is achieved through a set of in band messages exchanged between the mAP and the hAP which serves as the controller of the hAN. The hAP network may be organized as: pier-to-pier, pico-net, scatter-net, star or multi-hop topology, while the hAP acts as a bridge to the cellular network.

In "smart home", various appliances—ovens, TV sets, heat/air-conditioning equipment, lightening, security system or health monitoring equipment, etc. are wirelessly connected using one of the suitable wireless interfaces, such as: WiFi, ZigBee, Bluetooth, etc. does allow exchange of information and remote control of the home functions. Such network of connected appliances is frequently referred as Home Appliance Network (hAN).

In it's simplest form, each of the individual devices of hAN have an individual internet protocol address (IP Address), and a single interface (wireline or wireless), connecting the appliance to the internet. In such configuration each may be independently addressed and controlled from a remote location, but no information can be exchanged between individual devices.

In another form, at least one of the appliances will have two interfaces: one providing connection to the internet and another with the other appliance devices. Such network may be in the form of single or multi-hop star network—all communication is conducted through the device connected to the internet (controller), or in the form of a single-hop or multi-hop scatter-network, where each device (appliance) can communicate with the controller as well as can communicate with each other.

In yet another form, the hAN may be configured around hAP, which in addition to cellular and internet interfaces is equipped with additional interface providing connection to the home appliances. In such configuration, the hAP provides localized cellular service and act as a controller for the hAN.

The benefits of latest configuration are clear—the devices connected to hAN may be controlled: a) locally, through the user smart-phone UI; b) remotely (manually through the smart-phone UI), or semi-automatically (based in time); c) automatically where the user phone is in close proximity to the home utilizing the handovers (HO) between macro-cell to the hAP. Also such functionality enhances control capability of the system, it can't provide fully automated and intelligent control in a mobile environment.

Such intelligent control of the hAN in a mobile environment may be provided by integrating a mobile femto-cell with the home femto call acting as a controller of home appliance network. This functionality is provided through utilization of handovers between the macro-cell to femto-cell (mobile or home)—referred here as Macro-to-Femto Handoff or (M2FHO), and from the femto-cell to macro-cell—referred here as Femto-to-Macro Handoff or (F2MHO), and a set of dedicated in-band signaling messages. Those messages may be used as triggers to invoke certain state in the control procedures embedded in the hAP controller.

The hAP control procedures may be designed to optimize home energy consumption (change thermostat settings), by communicating handover to the mAP, which sends an in-band messages to the hAP, indicating the user is on the way home. During the travel, mAP retrieves car location information from the car's trip computer and sends update messages to the hAP. The hAP continuously estimates the user time of arrival and sends appropriate commands to individual appliances connected to the hAN to achieve optimal operational point set in the user profile. Furthermore, the hAP may communicate to the mAP about current status of home, including status of each appliance as well as send remainders based on the mAP location—for example if the user route is in proximity of grocery store, it may send the status of the refrigerator, while when the user is in proximity of home improvement store, information about burnout light is sent.

Each time F2MHO or M2FHO is performed, for example the user decided to stop and leave the vehicle (coverage area of mAP), information is sent to the hAP, which depending on the user profile or the current profile of the home may trigger additional control procedures. When the user is in vicinity of his home, a HO to the hAP is performed, now the remaining of home—lightning, TV programming, etc. is set according to preferences in the user profile. Such procedure is executed for each member of the household.

In addition, appliances connected to the hAN may provide ranging capability—communicating precise location of the selected user and send the location information back to the hAN controller, which in turn will automatically adjust the environmental parameters of said specific location—turn ON/OFF lights, increase/decrease local temperature, et.

BRIEF DESCRIPTION OF THE DRAWINGS

A better understanding of the present invention can be obtained when the following detailed description of the preferred embodiment is considered in conjunction with the following drawings, in which.

Figure 1:
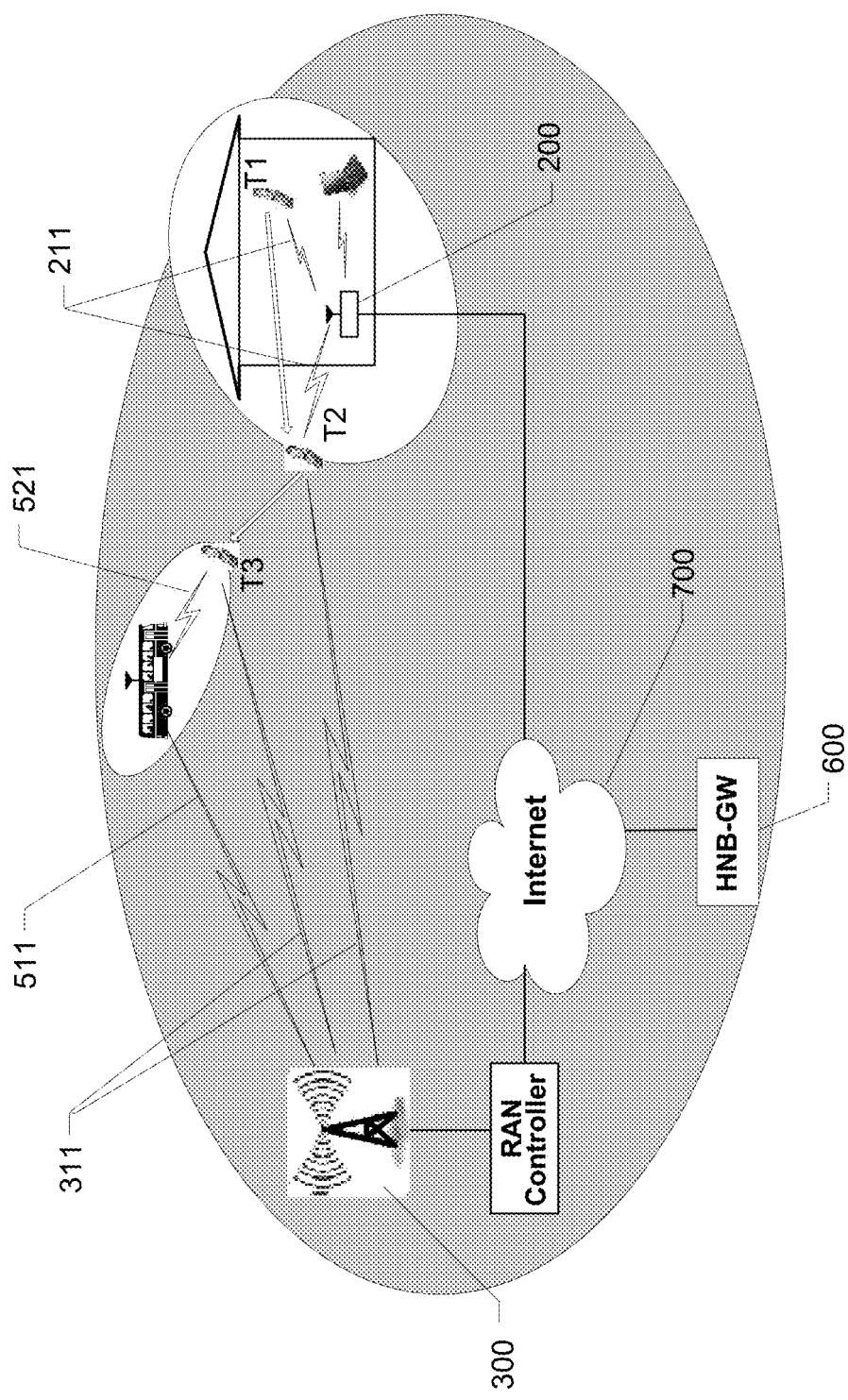
FIG. 1 presents Wireless Safety Network architecture.

While the invention is susceptible to various modifications and alternative forms, specific embodiments thereof are shown by way of example in the drawings and are herein described in detail. It should be understood, however, that the drawings and detailed description therefore are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Memory Medium—Any of various types of non transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor which connects to the first processor over a network, such as wireless PAN or WMAN network or the Internet. In the latter instance, the second processor may provide program instructions to the first processor for execution. The term "memory medium" may include two or more memories residing in different locations, e.g., in a different processors that are connected over a network.

Application—the term "application" is intended to have the full breadth of its ordinary meaning. The term "application" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Visual C, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including mobile terminal, personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Terminal—in the scope of this invention any wireless terminal such as cell-phone, smart-phone, etc. configured to operate in the cellular network.

Mobile Access Point—hereinafter referred to collectively as mAP, and in the context of this invention refers to a mobile femto-cell providing cellular communication services to the multiplicity of users located inside moving vehicle, Such mobile AP is configured with two radio interfaces, first providing communication with terminals located inside the vehicle, and second providing communication with the macro-cell. Such mobile AP radio interfaces may support multiple wireless technologies, such as: GSM, cdma2000, UMTS, LTE, etc, Home Access Point—hereinafter referred to collectively as hAP is the home femto-cell equipment providing localized cellular communication services for the wireless terminals inside the house. Such hAP is connected to the service provider network. Such home AP have at least two interfaces; primary to communicate with the wireless terminals, and secondary connected to the internet to communicate with the service provider network.

Control Node (CN)—in the context of this invention, central entity managing the wireless safety network or home appliance network.

Home Node (HN)—in the scope of this invention control function, which resides in the user home access point femto-cell (hAP).

Mobile Node—(MN)—in the scope of this invention control function, which resides in mAP Mobility Management (MM)—in the scope of this invention, function residing in the Control Node entity responsible for the maintenance of control, home and mobile nodes registry.

mCSG—in the context of this invention list containing mobile AP Closed Subscriber Group IDs assigned by the SMM.

Control Node Registry (CNR)—in the context of this invention, registry within MM containing the IDs of all Closed Subscriber Groups.

Home Node Registry (HNR)—in the context of this invention, registry within the MM containing IDs of all hAPs and the IDs of all wireless terminals associated with Control Node entity.

Mobile Node Registry (MNR)—in the context of this invention, registry within the MM containing IDs of the wireless terminal assigned to a particular mCSG.

Home Appliance Network (hAN), in context of this invention, a multiplicity of home appliances such as: TV sets, thermostats, refrigerators, garage doors, lights, audio equipment, in-home medical equipment, etc. each equipped with at least one short range wireless interface to communicate with each other or with the central controller (CN). Such radio interface may be in form of WiFi, ZigBee, Bluetooth, or any suitable short range wireless interface operating in unlicensed part of radio frequency spectrum.

Multi-user Channel or Common Traffic Channel or Shared Traffic Channel—in the context of this invention a single physical layer channel resource configured to carry communication dedicated to multiplicity of users using multi-user packets.

Multi-user Packets—in the context of this invention a single physical layer packet transmitted using the Physical Layer Common Channel resources and composed of one or more Media Access Control [MAC] layer packets intended for multiplicity of users.

Single-user Packets—in the context of this invention a single physical layer packet transmitted using the Physical Layer Dedicated Channel resources and composed of one or more Media Access Control [MAC] layer packets and intended for a single users.

Common Control Channel—in the context of this invention a single Physical Layer control channel carrying the control information associated with the Physical Layers Common Traffic Channel and intended to identify the dedicated users packets (Packet ID), located inside a Multi-user Packets.

Aggregation—in the context of this invention, a process performed by the MAC Layer to assemble single-user packets into a multi-user packet before transmission of said multi-user packet using the Physical Layer Common Traffic Channel resources, while including the ID of the dedicated user into a MAC Control Packet transmitted using the Physical Layer Common Control Channel resources.

Fragmentation or De-aggregation—in the context of this invention, a process performed by the MAC Layer to dis-assemble single-user packets from a multi-user packet received, using the Physical Layer Common Traffic Channel resources.

Downlink Channel—in the context of this invention, the Physical Layer resource carrying communication form the base station to the user terminal.

Uplink Channel—in the context of this invention, the Physical Layer resource carrying communication form the user terminal to the base station.

In-band Signaling (in-band message)—in the context of this invention, a message carried within the user payload (packet) containing specific to the application. information.

Status Response Message—in the context of this invention, an in-band massage sent by either the mAP or the hAP and containing such parameters as: user present/absent status; a pointer (packet ID) to record containing mAP route update information, user specific in-band messages, hAN current status and appliance set-points, etc. Such message may be sent after M2FHO or F2MHO is acknowledged by the Handoff Complete Message or be periodically requested by either the hAN controller of the mAP.

Status Request Message—in the context of this invention, an in-band message sent by either the mAP or the hAP requesting such information as: request for user present/absent status; request for mAP route update information, request for hAN current status, etc.

Macro-cell To Femto-cell Handover (M2FHO)—in the context of this invention, a handover of service by the mobile terminal from the cellular network macro-cell to the femto-cell.

Femto-cell To Macro-cell Handover (F2MHO)—in the context of this invention, a handover of service by the mobile terminal from the femto-cell to the cellular network macro-cell.

Brake-After-Make Handover—in the context of this invention, a handover from the cellular network macro-cell to the femto-cell, after which the service provided on the macro-cell dedicated channel is terminated and moved to the femto-cell secondary interface.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". Furthermore, the names used to describe various massages passing through the system are for example only.

DESCRIPTION

This invention leverages the functionality of handovers between the macro-cell and the femto-cell access points, one of which is a mobile femto-cell (mAP). In one embodiment, integration of the home femto cell access point (hAP), the mobile femto-cell access point (mAP) and the macro-cellular environment provides student safety and mobility management, allowing a virtual supervision of student's safety during their travel to/from school. In another embodiment, such integration allows a remote automatic management of a "smart home" functions.

mAP in a Student Safety Network

In this embodiment a school bus femto-cell(s), works as local femto-cell network, similar to home access point (hAP), connected to the internet gateway (hAP-GW), performs the control function during the time student leaves his/her home and during the school period, with the student's home femto-cells (hAPs), performing local service functions and the mobile femto-cells (mAPs) supervising the students scheduled transition between the W-MAN environment and the school bus.

The mAP, unlike conventional FAP supports two RF interfaces: primary RF interface is similar to the conventional FAP and designated to provide local service within the mAP coverage area, for example school bus and it's immediate vicinity; secondary RF interface, to provide communication with the service provider Radio Access Network (RAN) infrastructure. As such the mAP communication with the service provider network is not routed over the fixed-line internet but over another RF channel using same or different radio access technology as the primary RF interface.

In addition to providing dedicated services to mobile users, on it's secondary RF interface mAP may aggregate traffic of multiple users into multi-user packets. Such aggregation increases the system performance and capacity by increasing coding gain, avoiding allocation of multiple channels, avoiding fragmentation of transmission resources and collisions from multiple users in the uplink transmission.

Aggregation of single-user packets into multi-user packets is performed by the MAC Layer, which assembles said single user packets into a larger MAC packet before said logical packet is encoded (providing coding gain), and transmitted inside a multi-user packet using the Physical Layer Common Channel To allow extraction (de-aggregation/disassembly), the MAC Layer includes the ID of the user data packet into a MAC control packet transmitted on the Physical Layer Common Channel and associated with said channel.

Such technique is possible for transmission on the downlink (base station to the terminal(s) transmission due to the fact the individual users packets can be easily time aligned at base station MAC Layer. However, in the mobile environment without the mAP, the individual user packets are transmitted by individual user equipment MAC Layers, and since the individual user equipment is mobile and completely not time aligned (different distance to the base station), such multi-user transmission is not possible on the uplink (user equipment to base station). So, for example, the base station may transmit multi-user packets to 100 user terminals within it's coverage area using a single multi-user packet, but will have to allocate 100 dedicated channel resources to receive transmission form the individual users. Due to this fact and several other technical considerations, the capacity (and throughput) of all cellular systems is limited by the uplink.

In the case of mAP, all users are in close (space and time) proximity for the period between the M2FHO and F2MHO (period when all users are in the coverage of the mAP), as such mAP MAC Layer may aggregate the packets of all users located within it's coverage area and Transmit such aggregated traffic to the base station inside a multi-user packet using single Common Channel resource.

An example of such system integrating mobile femto-cell access point with the cellular system and home femto-cell access point into a student safety and social network is presented in FIG. 1. Here, at time t1 the mobile terminal is within the coverage area of student's home femto-cell (hAP), and communicates with the Home Node hAP 200 over local RF link 211, receives an alert message from the school based Control Node 600 about the school buss scheduled arrival time.

When at time t2, the student's wireless terminal performs a handover from the hAP 200 coverage area to the macro-cell 300 coverage area referred as femto-to-macro handoff (F2MHO), When the handover is completed (both the macro-cell and the hAP receives handoff completion message (HCM), the hAP stops transmitting to the student's mobile terminal (removes the dedicated channel resources) and sends handoff completion notification message to the Control Node 600 and updates students mobile registry, then sends an in-band student update status message to the mAP installed in the school bus.

After the F2MHO, the student's mobile terminal communicates with the macro-cell base station 300 using macro-cell dedicated channel resources over the RF interface 311. During this time, the Control Node 600 tracks the student location using the wireless network location based service (LBS), and monitors location of the mAP against scheduled bus stops and the student's scheduled handoff to the mAP.

When at time t3, the student's mobile terminal performs macro-to-femto (M2FHO) handover to the arriving school bus the mobile terminal sends a handoff complete message (HCM), which is received both by the macro-cell and the mAP. After receiving the HCM, the macro-cell discontinue transmission to this mobile terminal on it's dedicated channel resources and includes said communication into the multi-user traffic carried in the Common Channel over the mAP secondary RF interface 511. At the same time, the mAP Mobile Node 500, sends an in-band message informing of student's presence to the Control Node 600, using secondary RF interface 511.

In the first stage, the M2FHO handover is similar to traditional Soft-Handoff (SHO), in which both the "source" and the "target" base stations (BS) provide communication to the mobile terminal. Such HO is also called Make-Before-Brake and the duration of such HO is controlled by the distance from transmitting BSs and the Power Control for downlink and uplink respectively. When the received power is below predefined threshold, the BS is "dropped" (removed) by the mobile terminal (downlink), or "dropped" by the BS (uplink). It must be noted that in such traditional SHO, all BSs in SHO case will transmit the same information to mobile terminal, and receive the same information from the mobile terminal, does increasing interference to other users limiting the system capacity and throughput.

For the above reason, such "traditional" SHO is not desirable in the system deploying mAP, as the mAP may never leave the coverage area of the BS from which the HO is initiated does not require transmission of the same information on the macro-cell BS dedicated channel resources as well as on the mAP secondary RF interface, because the signal quality from the mAP received by the mobile terminal located within the mAP coverage area (inside the vehicle) is of the same or better quality then the signal quality received by the same terminal from the macro-cell. In such condition, continued transmission from the macro-cell after M2FHO is undesirable and considered as interference lowering the effective $E_b/N_o$ observed by the user does lowering his quality of service (QoS) according to:

$$P_{fail|i} = Pr\left[\left(\frac{E_b}{N_0}\right)_{eff} < \left(\frac{E_b}{N_0}\right)_{req} \bigg| i \text{ interferers}\right]$$

where:
$(E_b/N_0)_{req}$ is the required $E_b/N_0$ for the modulation-coding scheme in use
$(E_b/N_0)_{eff}$ is the effective received $E_b/N_0$;
and the QoS of all other users through the relations between the number of interferers and the effective SINR observed by the other users:

$$\left(\frac{E_b}{N_0}\right)_{eff} = \frac{P_0}{P_N + P_I + \sum_{k=1}^{i} P_k} \cdot \frac{W}{R_b}$$

$$= \frac{P_0}{(N_0 + I_0)R_b + \frac{R_b}{W}\sum_{k=1}^{i} P_k}$$

where:
$P_0$ received power from station of interest (W)
$P_k$ interference power from station k, k=1, . . . , i (W)
$N_0$ power spectral density (p.s.d.) of noise (W/Hz)
$I_0$ equivalent wideband p.s.d. of background interference (W/Hz)
$P_N$ noise power (W), $P_N=N_0W$
$P_I$ background interference power (W), $P_I=I_0W$
W bandwidth of transmitted signal (Hz)
$R_b$ information bit rate (b/s).

Figure 8A:
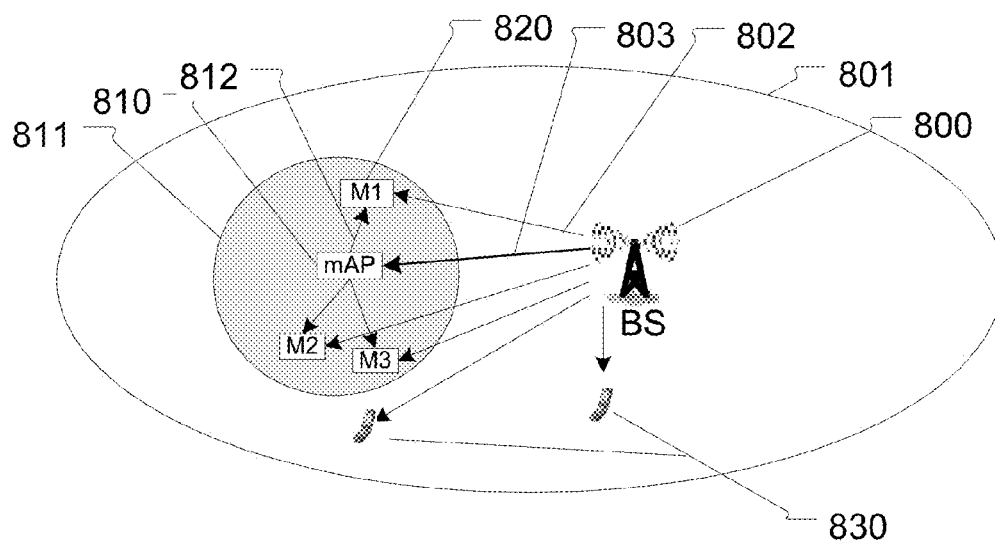
FIG. 8A presents macro-cell RF channel configuration and interference in the system deploying mobile femto-cell access point (mAP) in network using traditional soft handover (SHO).
Figure 8B:
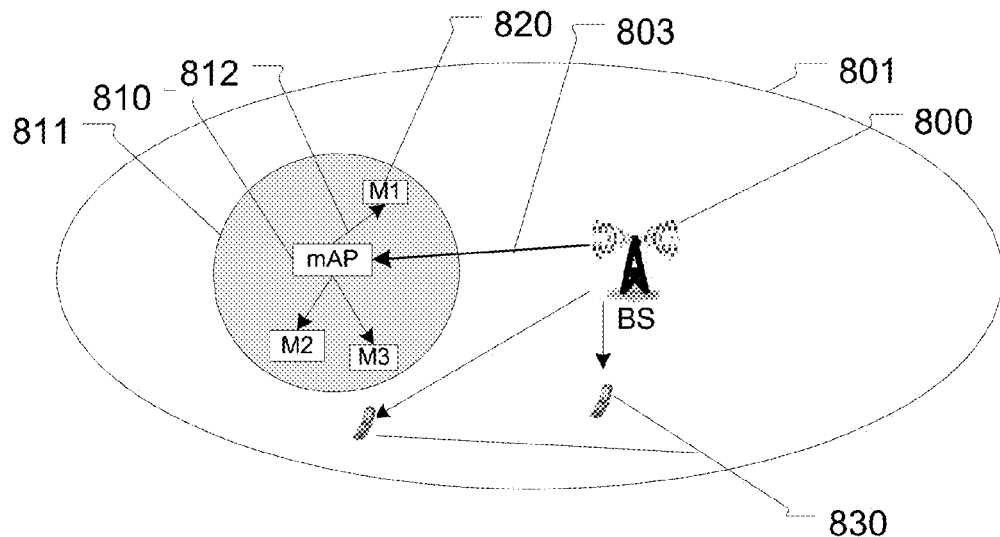
FIG. 8B presents macro-cell RF channel configuration and interference in the system deploying mobile femto-cell access point (mAP) in network using brake-after-make handover.

Those relations are graphically described in FIGS. 8A and 8B. In FIG. 8A, three mobile terminals: M1, M2 and M3 are within service area 811 of mAP 810, which in turn resides within the coverage area 801 of the macro-cell 800. One may observe that mobile terminal M1, M2 and M3 are in standard SHO receiving dedicated traffic from the mAP 812, and from the macro-cell 802, which indicates that when more terminals are located within the coverage area of the mAP, the more interference is observed at the receiver of each individual terminal as:

SINR=S/I+N meaning—the more interference (dedicated traffic channels transmitted by the macro-cell), the more power is required to achieve the same quality of service (QOS). Conclusion— in the presence of SHO, QOS depredates to the users of both the femto-cell and the macro-cell.

One may avoid such interference by organizing the network by allocating one frequency to a macro-cell(s) and a separate frequency to the femto-cell(s), effectively creating hierarchical network with the macro-cell frequency as an "overlay". While this is possible, also somehow difficult for a fixed location (home) femto-cells—with the growing number of frequency reuse, planning is necessary to avoid femto-to-femto interference, it is almost impossible in case of mobile femto-cell.

Figure 9:
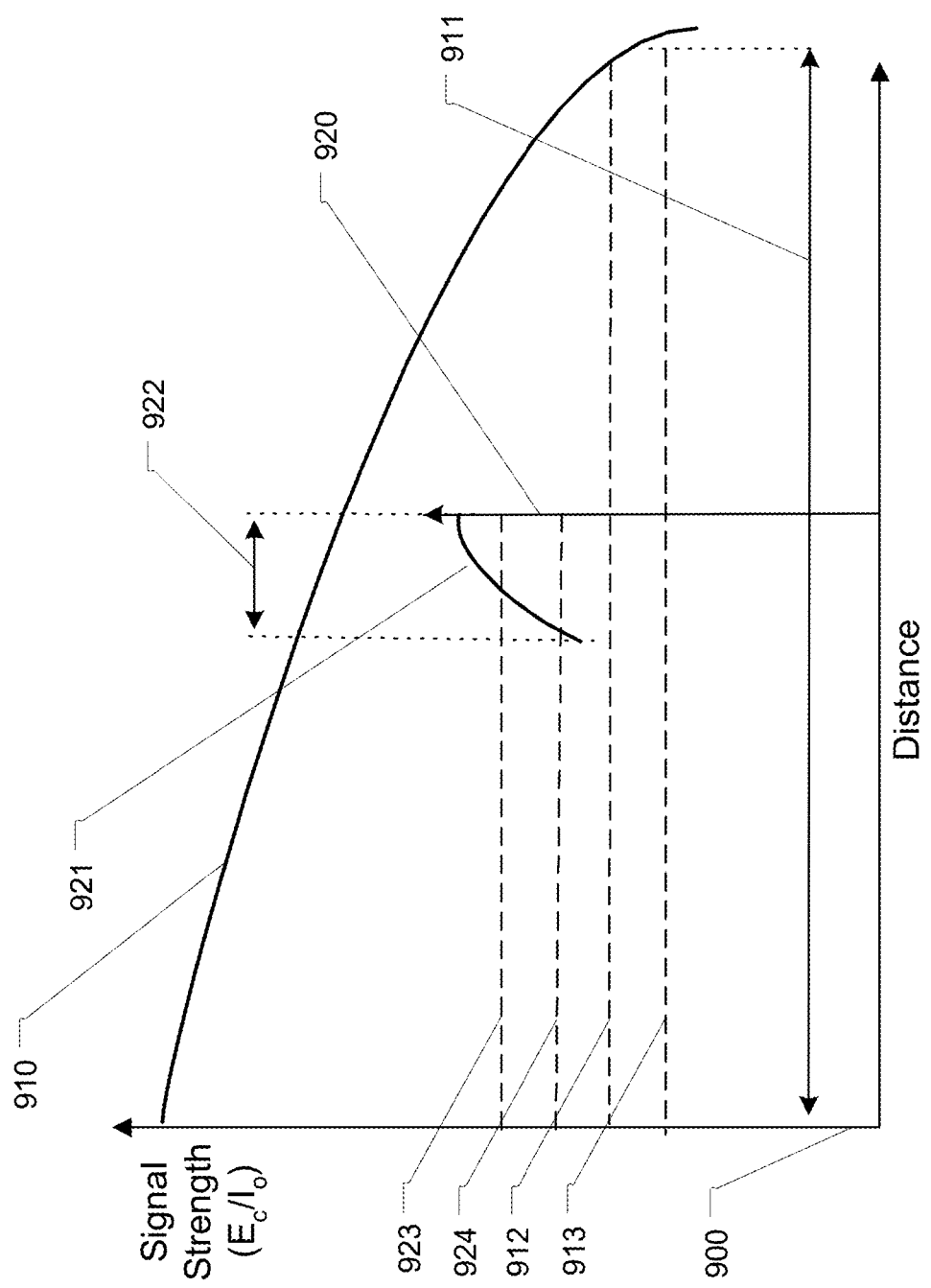
FIG. 9 is an exemplary diagram of the macro-cell to femto-cell access point handover (M2FHO).

The shortcomings of "traditional" SHO in the mobile femto-cell deployment in terms of signal strength in the macro-cell coverage is presented in FIG. 9. Here the macro-cell 900, coverage area 911, is several orders of magnitudes larger then the femto-cell 920, coverage area 922. Additionally, mobile femto-cell, will always be in the macro-cell coverage and it's signal strength 921, will at all time be much lower then the signal of the macro-cell. And the macro-cell $T_{ADD}$ threshold 912 and $T_{DROP}$ threshold 913 are below the mAP $T_{ADD}$ threshold 923 and $T_{DROP}$ threshold 924, while both the macro-cell and the femto-cell will transmit the same information to the mobile terminal, causing rise of interference and lower overall system performance. This condition will preside till the uplink power control forces the macro-cell to drop communication with the mobile terminal.

To avoid such unnecessary increase in interference and to improve system performance while preserving the BSs resources, we propose to modify the "traditional" SHO— frequently referred as make-before-brake handover, into brake-after-make handover. This handover have two phases: first phase—follows the procedure of "traditional" SHO, where the candidate base station (femto or macro cell), is added to the terminal active set and the Handoff Complete Message (HCM) 420, is sent; and second phase—after HCM is received, the macro-cell BS "moves" the user traffic to the mAP secondary RF interface Common Channel while at the same time terminates his service on the macro-cell dedicated channel.

The radio interface link configuration after such brake-after-make SHO is presented in FIG. 8B. Here we see that communication to M1, M2 and M3 terminals located within the coverage area of mAP 810, is carried inside a multi-user packets transmitted to the mAP via the Common Channel (or Shared Channel), then after said multi-user packets are de-assembled (de-aggregated), via a dedicated traffic channel to each individual terminal within the mAP service area. As the power allocated to such multi-user traffic channel is similar or lower (increase coding gain due to multi-user packets size), and the likelihood mAP deploys more advanced antenna technology, the advantage of brake-after-make SHO is clear.

Figure 10:
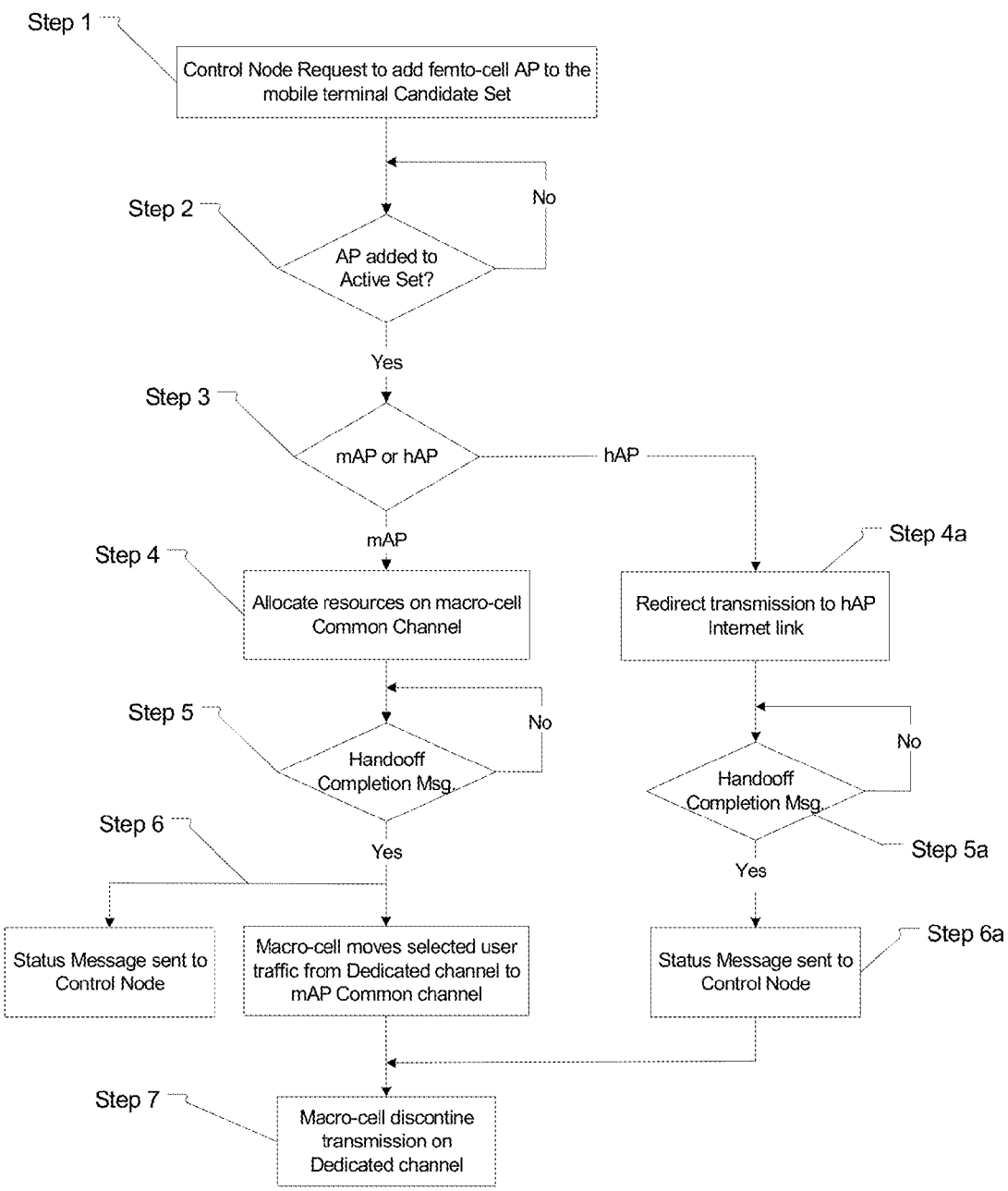
FIG. 10 is an exemplary control flow diagram of the M2FHO

The procedure for brake-after-make SHO is presented in the flowchart of FIG. 10. Here in Step 1 the femto-cell is added to the mobile terminal registered by the Control Node, to the terminal Candidate list, does providing for continuous measurements of it's signal strength. When the signal strength of said femto-cell exceeds $T_{ADD}$ level it will be added, in Step 2, to the mobile terminal Active Set (actively communicating with the terminal). One may recognize that Step 1 and Step 2 are identical to "traditional" handoffs. During Step 2, the macro-cell (and cellular infrastructure), received the reporting of femto-cell signal strength as well as a status identifying the Type (stationary femto-cell—hAP, or mobile femto-cell mAP), and depending on such status performs the following:

When the femto-cell Type status indicate hAP:
in Step 4*a*, cellular network establishes communication with the mobile terminal using hAP and it's internet connection;
in Step 5*a*, when both—the macro-cell and the femto-cell receives handoff complete message (HCM);
in Step 6*a*, the hAP sends in-band message to the Control Node, informing of the mobile terminal status (present/absent);
and in Step 7, the macro-cell terminates all communication with this mobile terminal.

When the femto-cell type status indicates mAP:
in Step 4 the macro-cell allocates resources on it's downlink and uplink Common (multi-user) channels allocated to the mAP;
in Step 5, both—the macro-cell and the femto-cell receives handoff complete message (HCM);
in Step 6, the macro-cell continue communication with this mobile terminal using the mAP secondary RF interface Common Channel resource and the mAP sends in-band message to the Control Node, informing of the mobile terminal status (present/absent);
and in Step 7, the macro-cell terminates communication to this mobile terminal previously provided via it's dedicated traffic channel.

After receiving the student present message, the Control Node updates the student status and sends an in-band status message to the hAP using it's internet backhaul interface 700, indicating student's presence in the school bus. Furthermore, depending on the student programming/homework schedule, the Control Node may add dedicated programming to the multi-user traffic transmitted by the macro-cell on the mAP secondary RF interface 511, while requesting (using in-band message), the mAP suspends all general communication—except in emergency, to the selected mobile terminal.

Communication between the macro-cell and the mAP is provided using the mAP secondary RF interface Common Channels (traffic and control). Such Common Channels may carry a multi-user traffic using single Physical Layer channel resource. The proximity of users guarantee the alignment of transmit time and the use of Common Channel, allowing to increase the efficiency of the cellular system by aggregating of individual users uplink and downlink communication into multi-user packets. is Aggregation of single-user packets into multi-user packets and fragmentation (de-aggregation), of multi-user packets into single-user packets is performed by the mAP MAC Layer.

For the uplink transmission, the individual user packets received from the multiplicity of users on the mAP primary RF interface Dedicated Traffic Channels are aggregated into multi-user packets by the mAP MAC Layer, then the multi-user packet is encoded and sent to the macro-cell using mAP secondary RF interface Common Traffic Channel, while the identity of the user and the selected user packet location (Packet ID), within the multi-user packet is sent using the mAP secondary RF interface Common Control Channel. Such Common Control Channel may be time multiplexed into the same physical layer channel as the Common Traffic Channel, or sent using a separate physical layer channel.

For the downlink transmission, the multi-user packets received from the macro-cell on the mAP secondary RF interface are decoded, then fragmented into a single-user packets by the mAP MAC Layer before the single-user packets identified by the Packet ID received in the Common Control Channel are sent to the selected user using mAP primary RF interface Dedicated Traffic Channels, while the identity of the user and the selected user packet location (Packet ID), within the multi-user packet is sent using the mAP secondary RF interface Common Control Channel.

Figure 11:
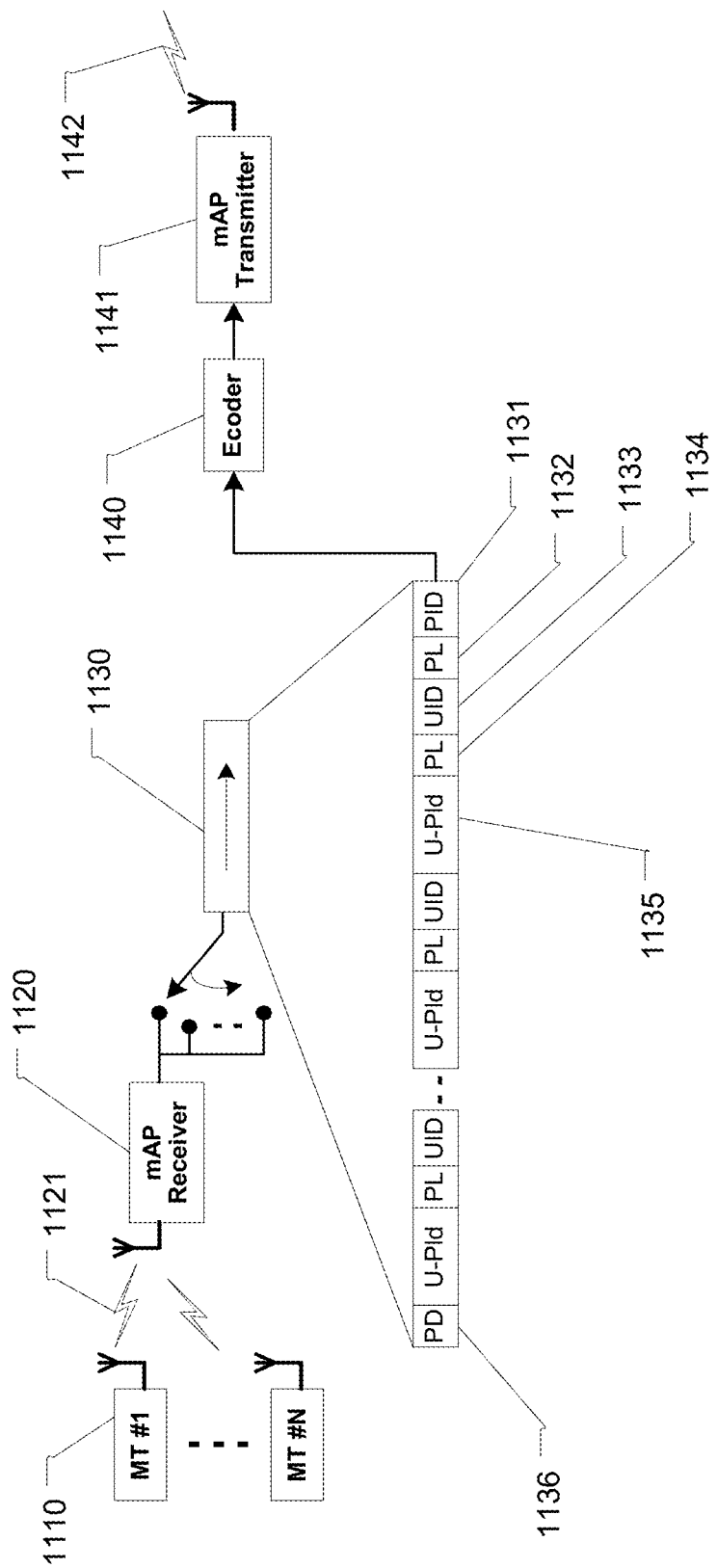
FIG. 11 presents an aggregation of the single-user packets into multi-user packets by the mAP MAC Layer for transmission on mAP uplink Common channels of the secondary RF interface.

The operation of aggregation of multi-user packet by the mAP MAC Layer before transmission of said packet to the macro-cell on the mAP secondary RF Common Channel is presented in FIG. 11. Here, the mAP receiver 1120 receives packets from a multiplicity of mobile terminals 1110 on the mAP primary RF interface 1121 Dedicated Channels. After decoding, said packets are assembled into a single multi-user packet 1130 consisting of: Packet Header 1131, which includes the ID of the multi-user packet; a field indicating the length of the multi-user packet 1132; an ID of the individual user 1133; the length of the individual user packet 1134; and the content (payload) of this individual user packet. The fields 1133 through 1135 are repeated multiple time for each individual user packet located within the multi-user packet up to the desirable length while the reaming length may be filled by the so-called "padding" bits 1136. Then such multi-user packet is sent to the encoder 1140, by an appropriate forward error correction code and transmitted to the macro-cell using mAP secondary RF interface 1142 Common Channel 1141.

When the mAP arrives at the school, student's mobile terminals perform handover to the Control Node 600, either directly as femto-to-femto handover (F2FHO) or indirectly (if the coverage area of the Control Node 600 is limited), as F2MHO followed by M2FHO. After this last handover is completed, all of the student's mobile terminals are under the control of Control Node femto-cell, until the handover to the macro-cell, indicating the mobile terminal moved out of the Control Node coverage area and back to the macro-cell coverage area, for example—student left the school.

The Control Node 600, monitors students presence by monitoring handovers from/to macro-cell environment, maintains student's class schedule and provides all wireless communication from/to student's mobile terminals. By maintaining school scheduled periods and individual student's class assignment, the Control Node, can provide "Quiet Class Periods"—periods during which only incoming and outgoing emergency call (E911 and predefined personal emergencies) are routed through the hAP-GW backhaul interface.

Figure 2:
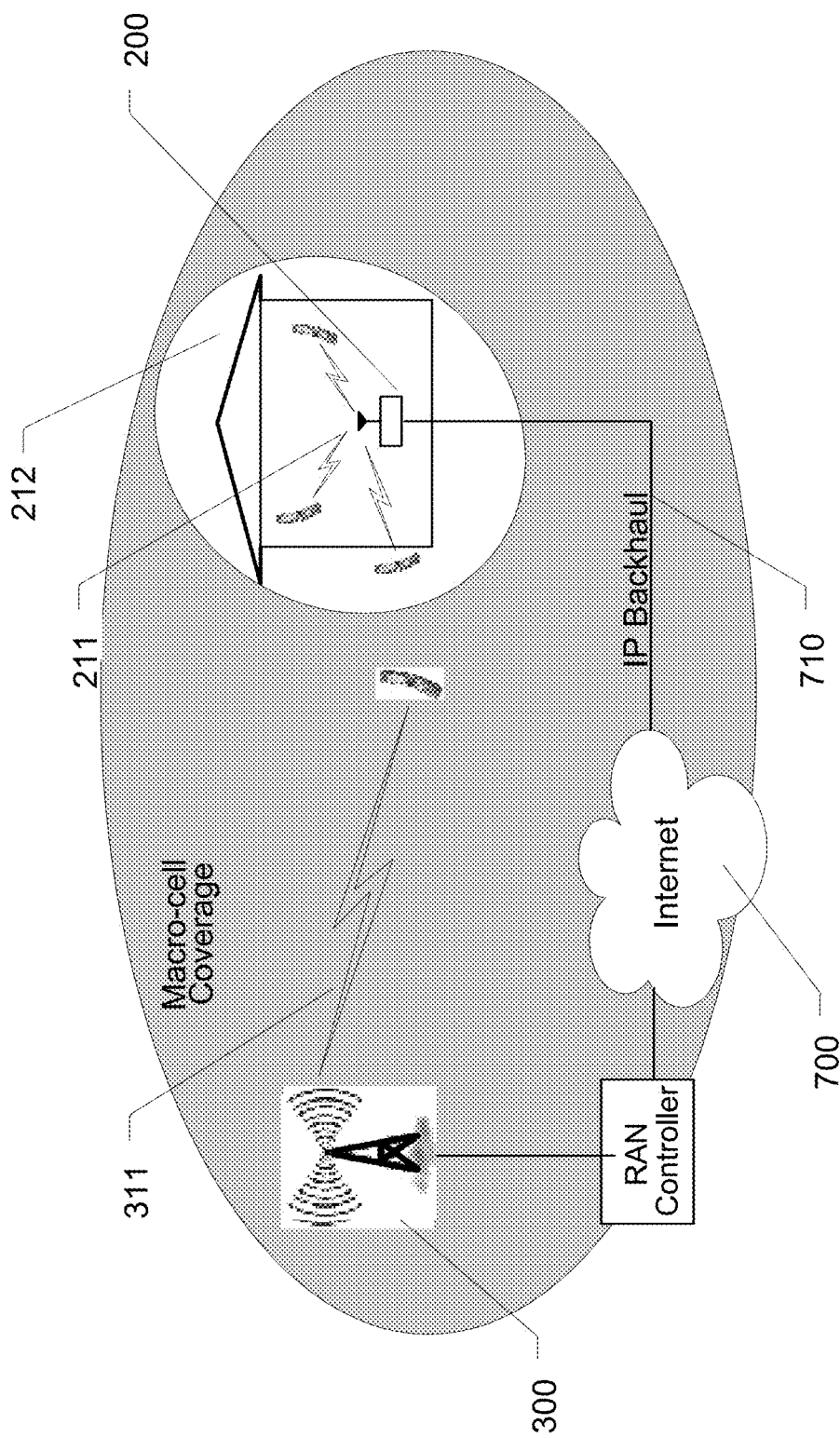
FIG. 2 presents the home femto-cell access point (hAP)

Typical deployment of hAP presented in FIG. 2 indicates it's primary functionality—to provide localized wireless services within the user home. It can be seen that when the wireless terminal 400 is outside of the hAP coverage area it is serviced by the macro-cell base station 300 over the RF interface 311. However, when the wireless terminal 400 is within the coverage of the hAP 212, it is serviced by the femto-cell RF interface 211, and the traffic is routed over the hAP fix-line interface 710 and Internet network 700 to the service provider core network.

The Home Node application residing in the hAP provides a set of procedures designed to communicate with the Control Node over the hAP interface 710 as well as a means to authenticate the authorized supervisor of Home Node functionality. The exemplary architecture of Home Node is presented in FIG. 6.

Figure 3:
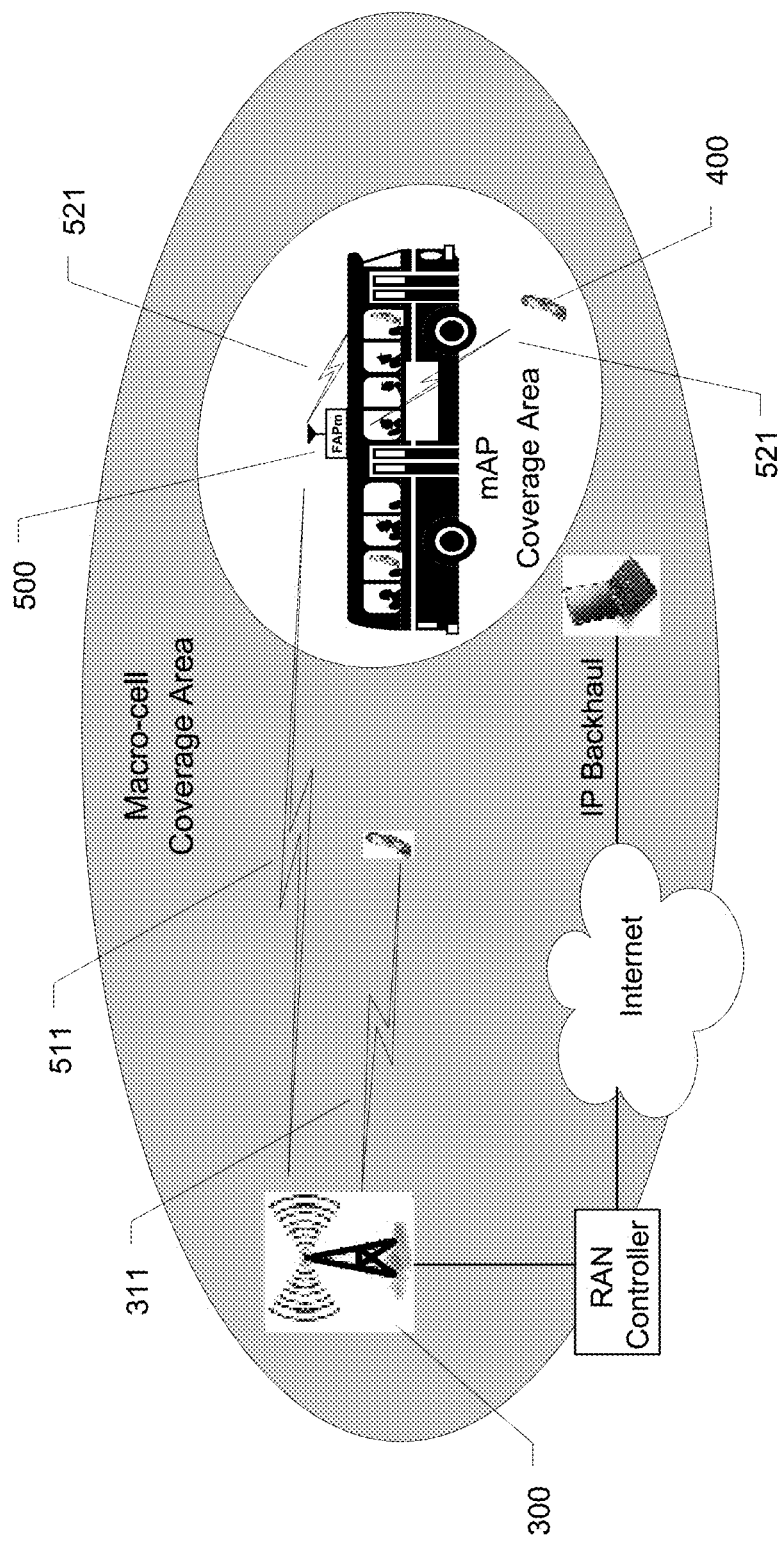
FIG. 3 presents general concept of mobile femto-cell access point (mAP)

FIG. 3 presents exemplary deployment scenario and interfaces of the mobile femto-cell (mAP) in a macro-cellular system. Here we see that when the wireless terminal 400 is outside of the mAP local coverage area, it communicates with the "outside" world over the macro-cell base station primary RF interface 311. However, when the wireless terminal is in the coverage of the mobile femto-cell (mAP) 500, located in this case in the school bus, it communicates locally over the mAP primary RF interface 521, but it's traffic is routed to the service provider network over the mAP secondary RF interface 511 using Common Channel multi-user packets.

Figure 4:
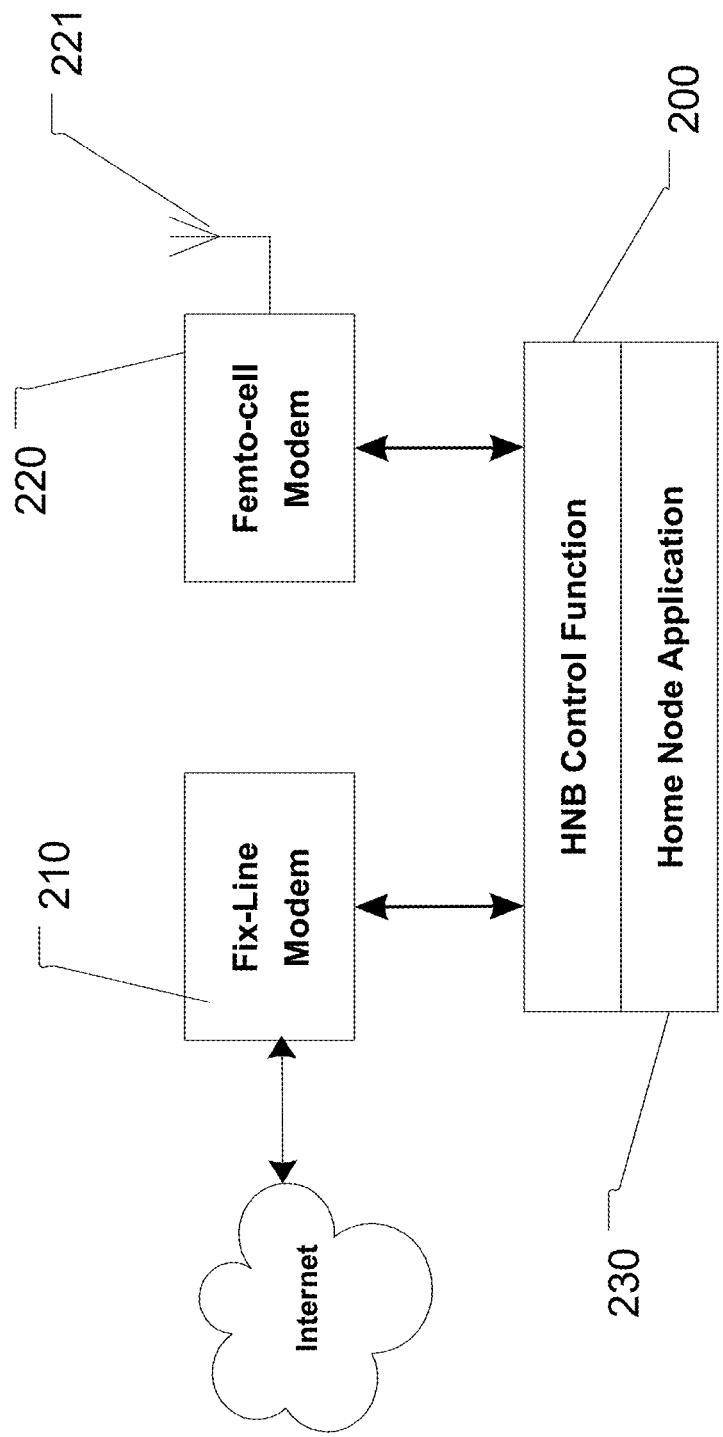
FIG. 4 is an exemplary block diagram of the Control Node.

FIG. 4 describes the exemplary architecture of the hAP which is the host of Home Node application including a set of functions designed to communicate with the Control Node, provide authentication to the student home supervisory procedures and provide list of emergency procedures and phone and IP addresses.

Figure 5:
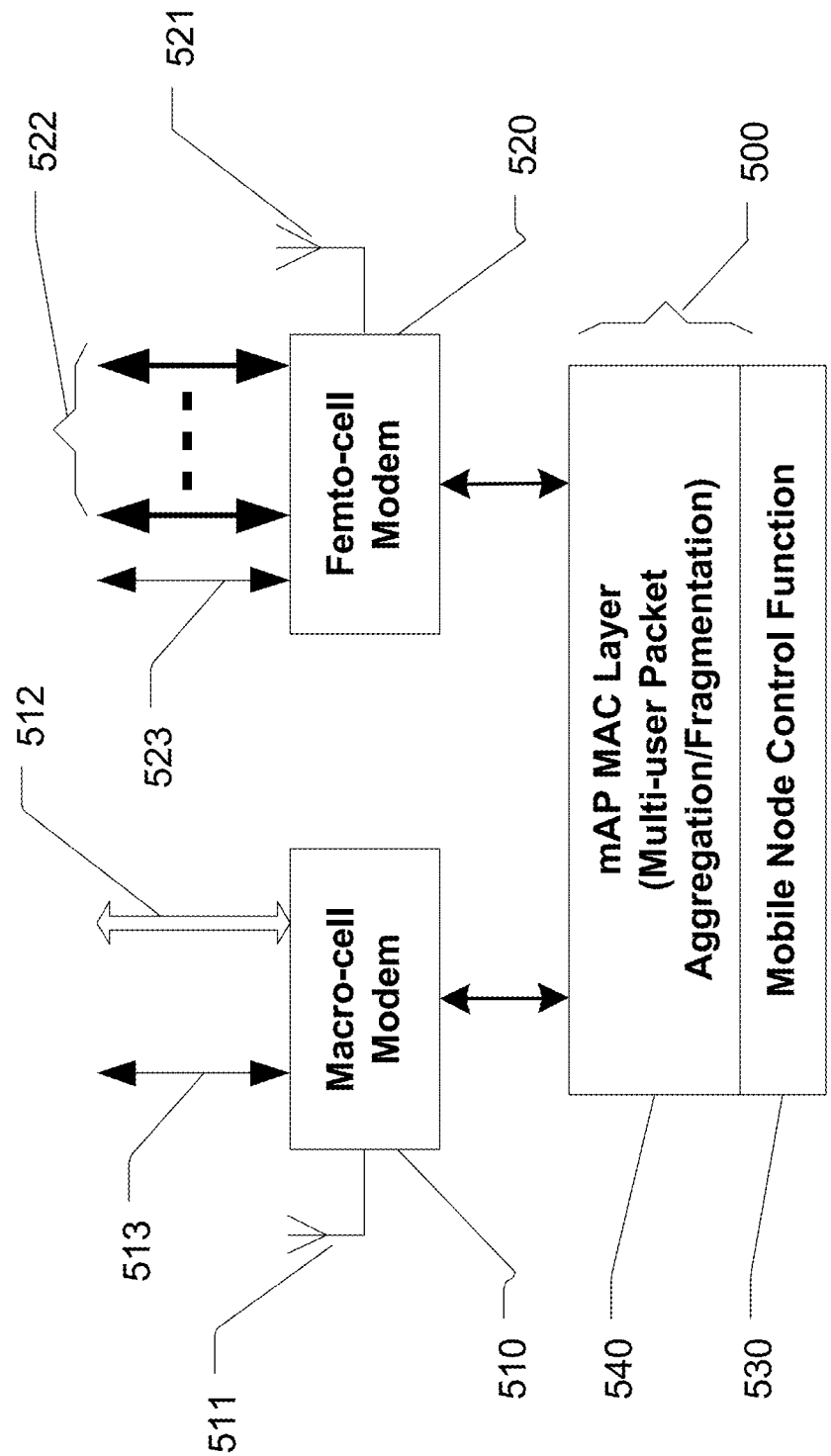
FIG. 5 is an exemplary block diagram of the mobile femto-cell access point mAP.

An exemplary architecture of Mobile Node is presented in FIG. 5. Here the mAP provides local communication to the school students community using wireless modem 520 and it's primary RF interface 521, while routing all incoming and outgoing traffic to the service provider core network using wireless modem 510, and secondary RF interface 511. The wireless modem 520 providing localized communication to the multiplicity of users inside the vehicle using a dedicated channel resources 522, and a common control resources 521—similar to standard macro-cell. The wireless modem 510, providing communication between the mAP and the macro-cell consist of a single common control channel 513 and a single common traffic channel 512 currying a multi-user traffic inside a multi-user packets. To allow for such multi-user traffic the mAP MAC Layer includes an Aggregation/Fragmentation function providing assembly and disassembly of a multi-user packets. The Mobile Node function 530 located in mAP provides set of control functions and procedures intended to manage the school bus scheduled rout and students presence through the supervision of M2FHO and F2MHO.

Figure 6:
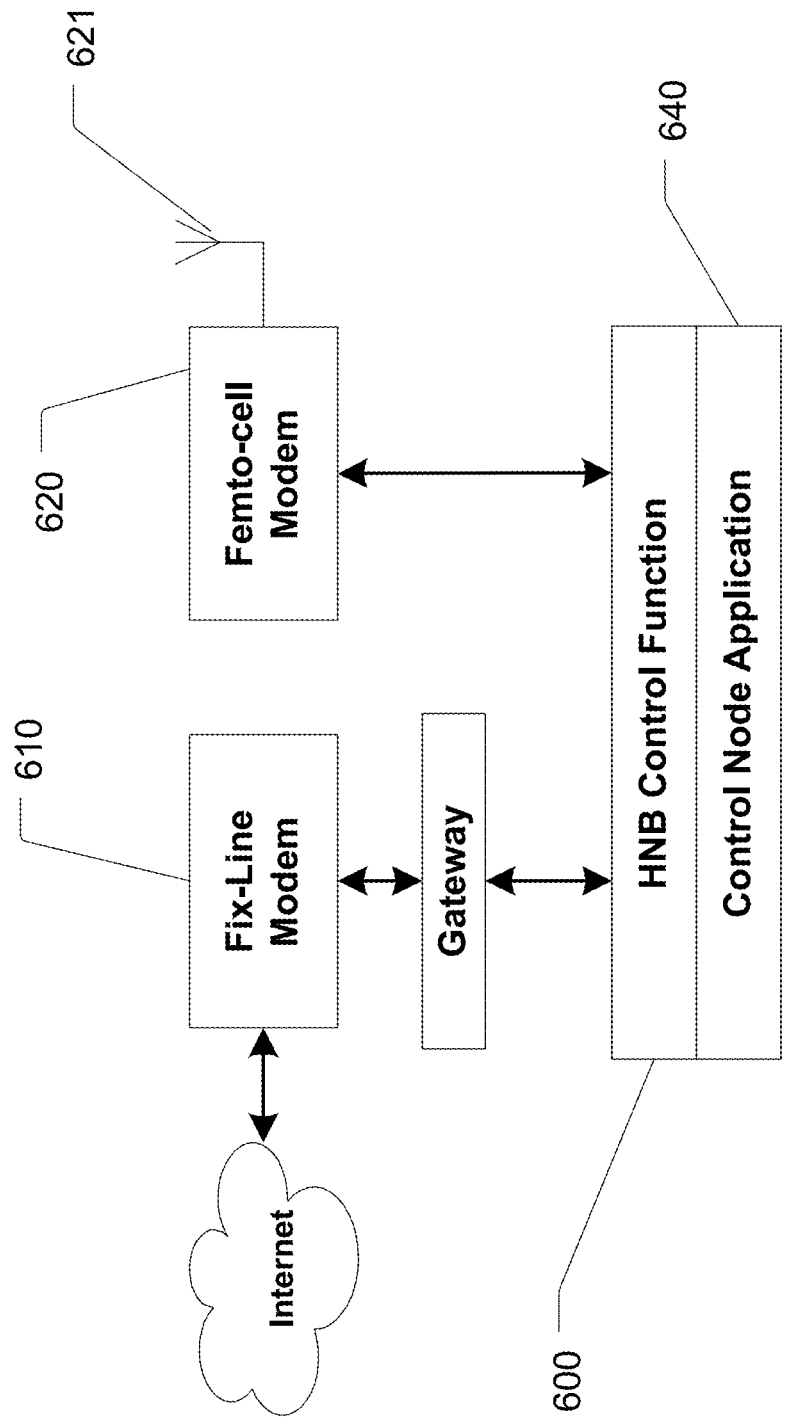
FIG. 6 is an exemplary block diagram of the Home Node.

An exemplary architecture of Control Node is presented in FIG. 6. Here the hAP 600 provides local communication to the school students community using wireless modem 620 and it's RF interface 621, while routing all incoming and outgoing traffic to the service provider core network over it's fixed line connection 610 and the Internet.

Figure 7A:
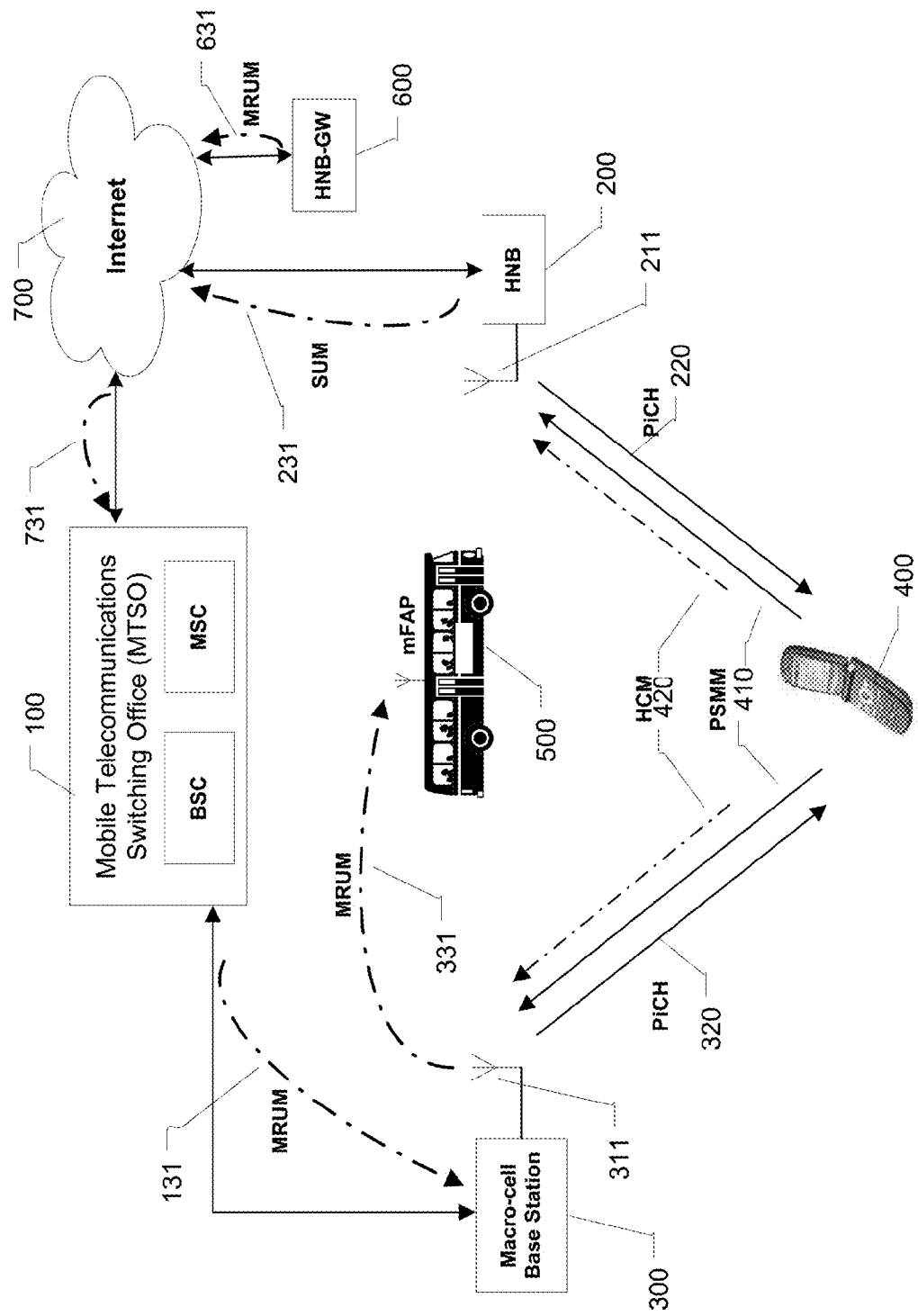
FIG. 7A presents operations and message flow between the Control Node entity, mAP and hAP during Femto-to-macro handovers.

The operation of the student safety system during the F2MHO (when student leaves his/her home) is presented in FIG. 7A. Here, the mobile terminal 400 continuously monitors the strength the Pilot Channel (PiCH), 220 from the serving femto-cell 200 and the strength of the PiCH 320 of the macro-cell base station then sends those measurements in a measurement message, such as Pilot Strength Measurement Message 410. Such measurements are compared with the predefined thresholds designed to determine the boundary of the femto-cell coverage area. When the PiCH signal 320 is above such predefined threshold and the PiCH signal 220 is below such predefined threshold, a dedicated channel resource is allocated by the macro-cell base station 300 and message instructing to perform "hand-over" (such as adding the macro-cell 300 to the Active Set, etc.) is sent to the mobile terminal. In response, the mobile terminal 400 sends a handover complete message 420.

The HCM 420 is received both by the macro-cell BS 300 and by the hAP 200, indicating the completion of the handover—now the service to this mobile terminal is provided by the macro-cell 300 and the Mobile Switching Center updates all it's appropriate registry.

In case that the scheduled F2MHO did not occur, the Control Node, sends an in-band message Alert Request to the specific Home Node IP address, in response to which the Home Node performs it's predefined Absence Alert functions. If the conditions due which the scheduled handover didn't occur are accepted, for example: student stays home with parental permission, etc, the Home Node sends the Alert Cancel Message to the Control Node. If the Alert Cancel Message is not received within the specified period of time, Control Node enters the Alarm procedures.

When the hAP receives the HCM 420, it passes it as a status to the Home Node, which in turn generates the Status Update Message 231, which includes the Home Node ID, Student Terminal ID, and Status and sends it to the Control Node 600 IP address.

The information from the Status Update Message sent by the Home Node is used by the Control Node resident Mobility Management (MM), registry. After the registry updates, the Control Node 600 sends an in-band Mobile Registry Update Message (MRUM) 631 to the Mobile Node IP address managed by core network 100. The core network mobility management functions selects the macro-cell BS 300 which currently services the mAP which sends it to the mAP 500. The MRUM is passed to the Mobile Node application 530 which updates it's mobile Closed Subscriber Group IDs (mCSG) and the Mobile Node Registry with the parameters contained in the MMUM message, such as: students mobile terminal IDs, and their scheduled pick-up stop, or absence/presence flags, etc.

Figure 7B:
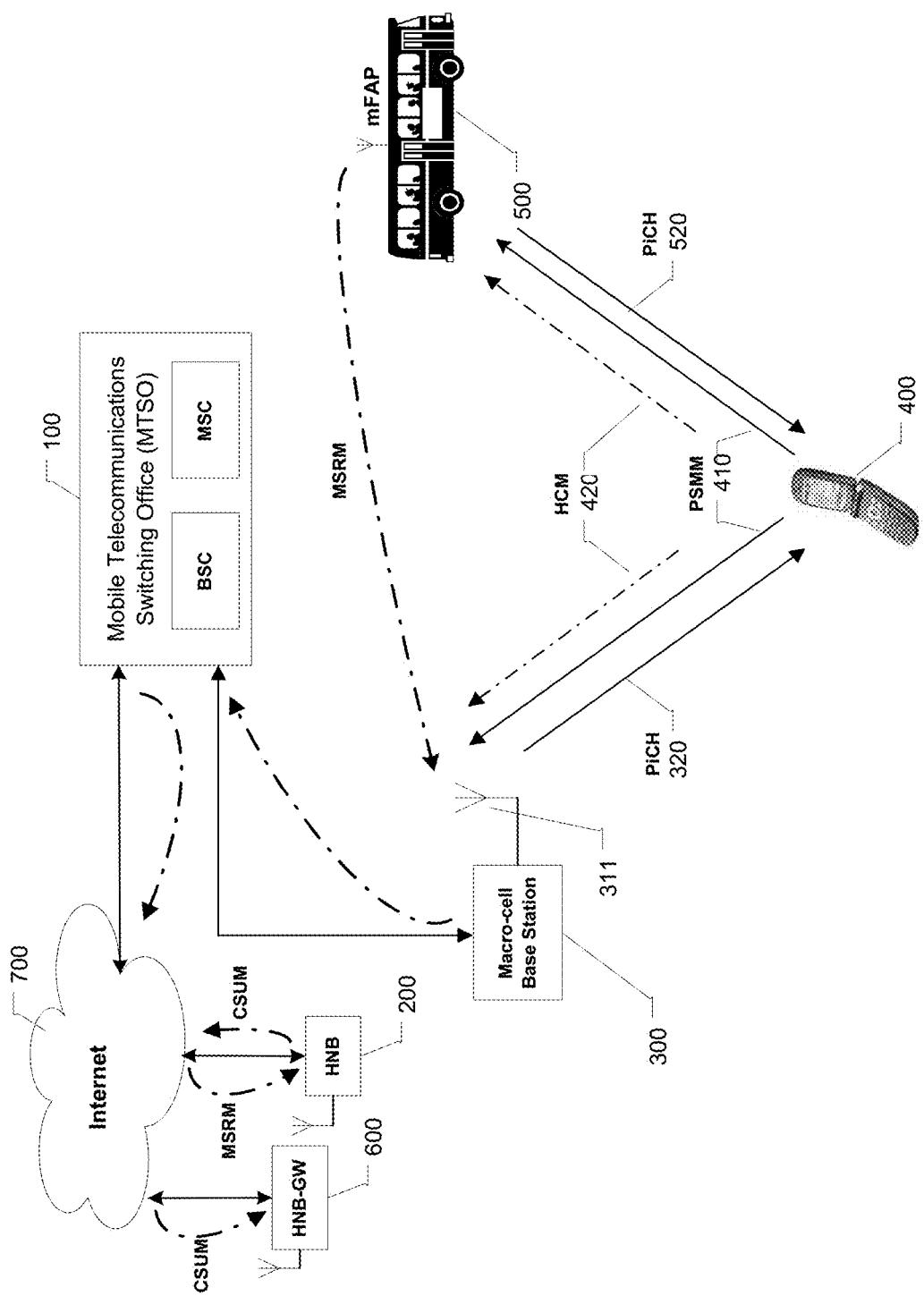
FIG. 7B presents operations and message flow between the Control Node entity, mAP and hAP and hAP-GW during macro-to-mobile AP handovers.

FIG. 7B presents an exemplary procedures performed when mAP 500 arrives at each scheduled bus stop. At this time the Mobile Node retrieves list of all mobile terminals scheduled for this particular boarding, then waits for the conformation of successful handover.

When the student's mobile terminal 400 is within the coverage area of the mobile femto-cell, the mAP PiCH signal strength reported by the mobile terminal in PSMM message exceeds the predefined M2FAP threshold and the MSC directs the mobile terminal and the mAP 400 to perform handover. Upon completion of such handover, the mobile terminal 400, sends Handoff Complete Message (HCM) 420 which is received by the macro-cell and the mAP.

The HCM received by the mAP with terminal IDs is passed to the Mobile Node 500, which updates it's Mobile Node Registry, then sends and in-band Status Update Message, to the Control Node IP address using it's RF interface 511 to the macro-cell BS 300. In the Status Update Message, the Mobile Node sets the "PRESENCE" flag to "ON" for each terminal with successful handover—indicating student's presence, and sets the "PRESENCE" flag to "OFF" for each terminal with unsuccessful handover—indicating student's absence.

Upon receiving the Status Update Message, the Control Node updates the Control Node Registry and for each terminal ID with the "PRESENCE" flag set to "OFF", sends an Alert Request message to the specific Home Node IP address, then waits for the mAP to send an in-band message—Alert Cancel Message with conditions canceling the allert. If the Alert Cancel Message is not received within the specified period of time, Control Node enters the Alarm procedures.

Upon receiving Alert Request message from the Control Node, the Home Node performs it predefined Absence Alert functions. If the scheduled handover didn't occur, for example: student returns home with parental permission, etc, the Home Node sends the Alert Cancel Message to the Control Node.

After the mAP arrives at the school, it sends a Route Update Message the Control Node which includes the list of all mobile terminals IDs and their status. The Route Update Message may be send over the mAP secondary RF interface (via macro-cell BS and service provider network) or in case femto-to-femto handover (F2FHO) was executed—the mAP and hAP-GW coverage areas overlaps, directly to the Control Node.

Now the Control Node updates it's registry and assigns each individual student's mobile terminal to one or several Closed Subscriber Group (CSG), according to his/her individual class schedule. If the Control Node is equipped with location based service (LBS), it may in addition send alert messages to the student mobile terminal in case he/she is out of the class area when the instruction is about to start.

Furthermore, when the student's mobile device is registered with the Control Node, any direct communication links from the mobile terminal to any other base stations is removed, and the handovers back to macro-cell are suspended until the Control Node signal level received by the mobile terminal indicates that the said mobile terminal is within the femto-cell coverage area and the signal strength of the macro-cell received by said mobile terminal is within acceptable level. As such, the Control Node is able to supervise each student scheduled class time and his presence within the school premises, while the network capacity and performance (macro-cell do not transmits to said mobile terminal or performing unnecessary handovers).

At the class scheduled start time, the Control Node may introduce the "Quiet Class Periods" in each classroom by blocking all non-emergency incoming and outgoing communication from the student's mobile terminals and an indication may be given to the mobile terminal that it is in a localized silence zone. The indication may include a request that the mobile device operate in a silent mode, information about making outgoing calls, information about receiving incoming calls, or a combination of these. Procedures for incoming voice calls to the mobile device may be different for different priority levels.

When an incoming call from a outside caller is received during the class silent period, the access point base station (hAP-GW) delays sending the page message, indicating the device is in a silent zone and instructing on procedures to place an immediate emergency call to this particular device. If such procedure is performed, the call is allowed and the mobile terminal is paged.

To provide such functionality, several types of information in the form of lists, tables, parameters, etc. must be stored for the use by various parts of the system. Furthermore, such information must be protected against unauthorized modifications by secure login privileges and passwords.

First such information consisting list of all students and associated terminal IDs, as well as student's home femto-cells IP addresses and IDs of all mobile terminals associated with this hAP.

A second such information defines association among the mobile terminals (e.g. defining which access terminals belong to which mCSG, and the mAP for an inbound route and authorizing a mobile terminal to access the mobile femto-cell components belonging to this group.

A second such information defines association among the mobile terminals (e.g. defining which access terminals belong to which mCSG, and the mAP for an outbound route and authorizing a mobile terminal to access the mobile femto-cell components belonging to this group.

A forth such information contains the group association among mAPs defining each mAP route and the handover schedule for mobile terminals belonging to it's Closed Subscriber Group.

A fifth such information, contains the group association of wireless terminals IDs with the scheduled classes, class location.

A sixth such information containing a list of student's legal guardians and their emergency phone numbers and IP addresses.

A seventh such information contains list of pre-authorized Alert Cancellation Messages.

mAP in a Home Appliance Network

In this embodiment functionality, handovers between the macro-cellular environment, the home femto-cell access point (hAP), and one or more mobile femto-cell access points (mAP), are used to facilitate integration of mobile femto cell with the home access network (hAN), and functionality of "smart home". In such system the hAP serves as a Control Node of a Home Appliance Network (hAN), integrating home appliances with transportation and health infrastructure (such as: cars, public buses, trains, electric cars charging stations, health facilities, etc.), providing an autonomous control of home appliances, analysis of transportation services or monitoring of user medical parameters.

Figure 12:
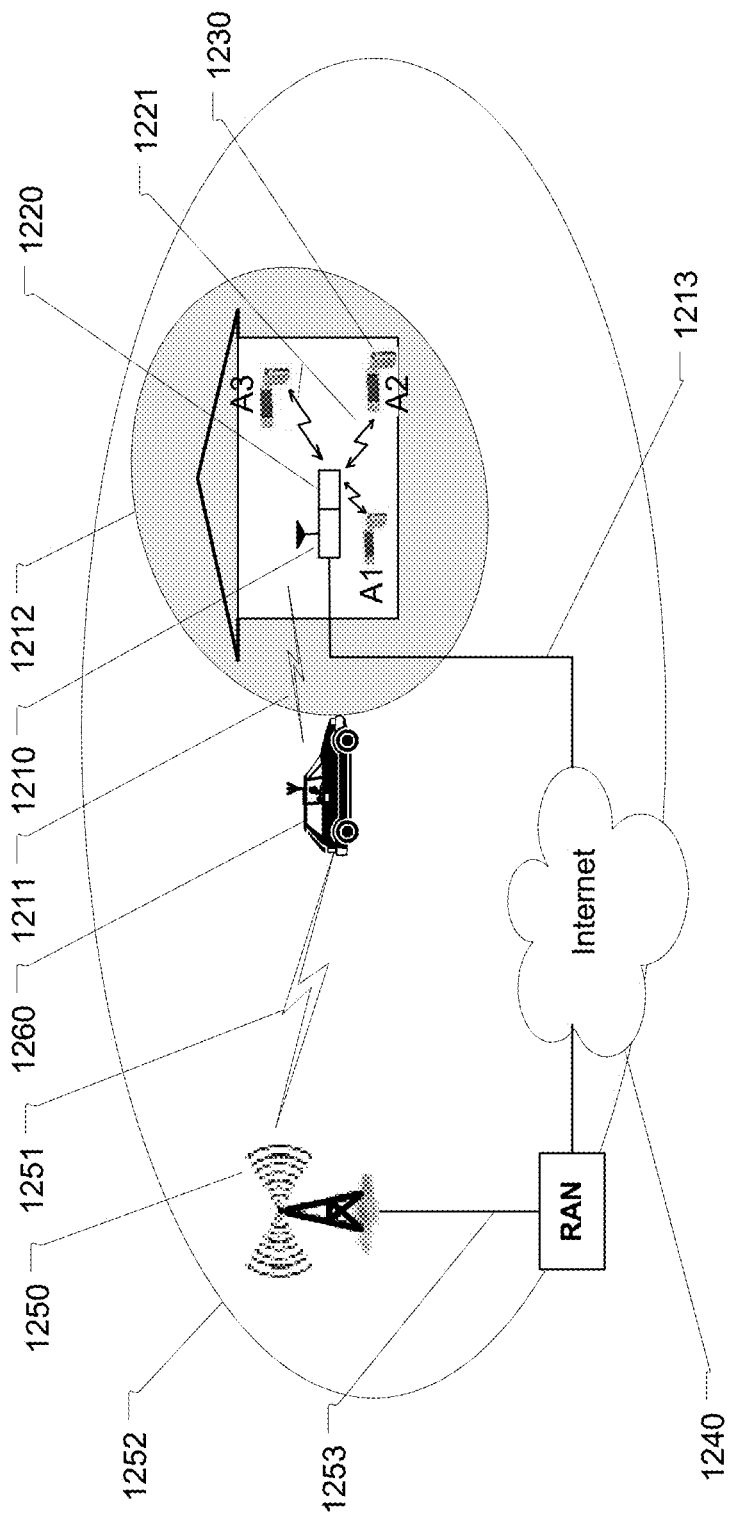
FIG. 12 is an example of integrating mobile access points with home appliance network.

The exemplary deployment of such system is presented in FIG. 12. Here the home appliance network consist of and Control Node, which integrates the home femto-cell 1210 (hAP or hAP-GW), and the home appliance network controller 1220, which provides wireless interfaces 1221, to various appliances and devices 1230, located inside the home. The hAP provides wireless connectivity using one of the standard cellular radio interfaces 1211, to the mobile terminals in it's coverage area 1212 (inside and immediate vicinity of the house), and connects to the cellular network infrastructure through the internet network 1240 using an appropriate wireline or wireless interface 1213. Such home appliance network is integrated with the mAP through the macro-cell base station 1250 RF interface 1251 and cellular network infrastructure backhaul interface 1253, the internet and the hAP interfaces.

The mAP, consists of a Control Function, configured to verify the authorized user(s), their association with the hAN, supervise the authorized mobile terminal handovers from/to macro-cell and provide in-band signaling indicating the presence of the authorized mobile terminal in the mAP coverage area and to respond to any in-band massages sent by the Control Node located in the hAP—such as: updates on the location and route of the mAP; retrieves the status of the vehicle from the vehicle control computer; retrieves the medical parameters associated with the selected user from the sensors controlled by the user mobile terminal; etc.

The mAP supports two RF interfaces: primary RF configured to provide local service within the mAP coverage area, for example a vehicle and it's immediate vicinity; secondary RF interface, to provide communication with the service provider Radio Access Network (RAN). This secondary RF interface consist of a Common Channel carrying traffic of all users within the mAP coverage area inside a multi-user packets. The typical architecture of the mAP is presented in FIG. 5, and consist of: a femto-cell modem 520, providing communication services to the multiplicity of mobile terminals within it's coverage area using Dedicated Channels 521; a MAC Layer function 540, providing aggregation/fragmentation of multi-user packets; a macro-cell modem 510 supporting communication to/from the macro-cell base station using single Common Channel carrying multi-user packets 511, and a control function 530.

To avoid allocation of multiple channel resources to the mobile terminals in the mAP coverage area (inside a vehicle), the traffic of multiplicity of users carried on the mAP secondary RF interface (to/from macro-cell base station) is aggregated into multi-user packets. This function is performed by the mAP MAC Layer, which assembles single user packets into a larger MAC packet then jointly encoding said large said logical packet (providing coding gain), for transmission using the mAP secondary RF interface Physical Layer Common Channel. Similarly, the transmission from the macro-cell base station received on the mAP secondary RF interface Common Channel is disassembled (fragmented) before delivery to the individual mobile terminals on the primary RF interface Dedicated Channels.

Figure 13:
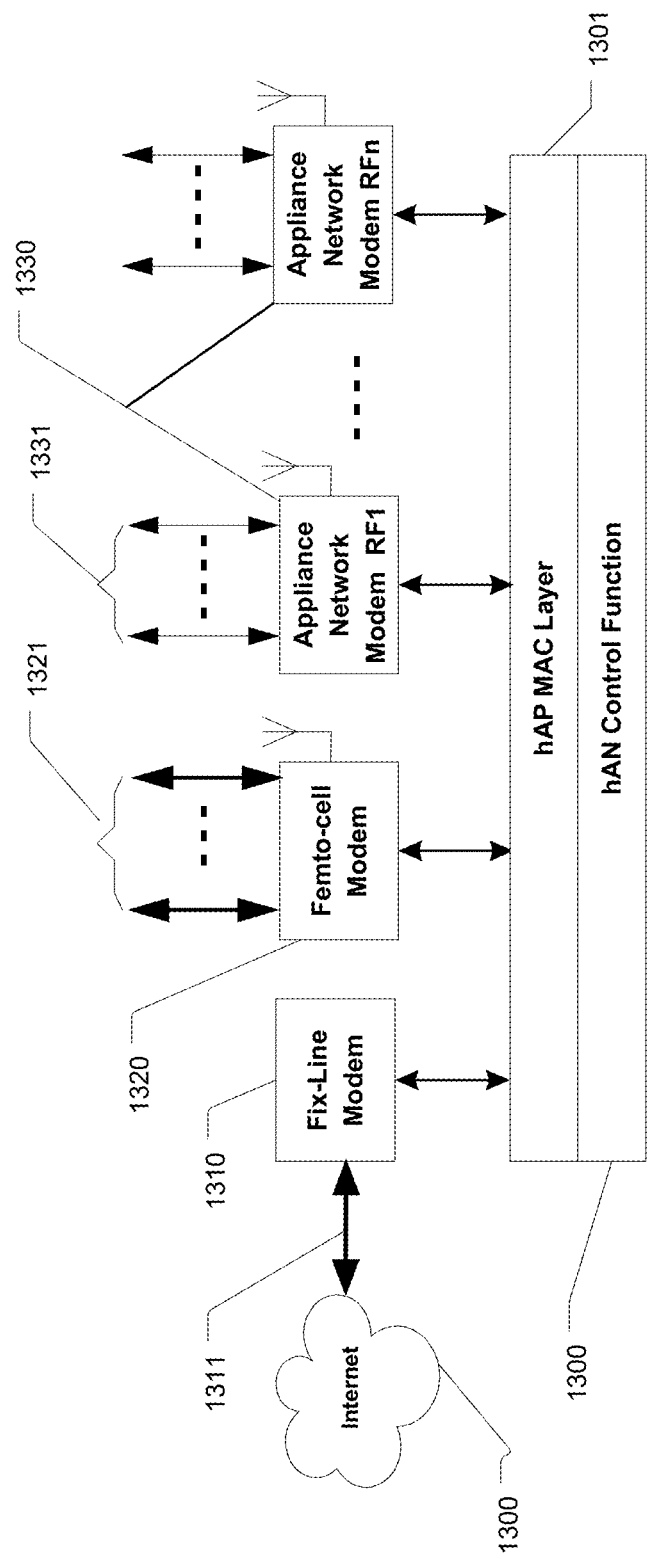
FIG. 13 presents an exemplary architecture of the hAP based home appliance network controller.

The exemplary home network controller is presented in FIG. 13, and consist of: hAN Control Function 1300, hAP Control Function and MAC Layer 1301, the fixed line modem 1310, connecting the hAP Control Function to the internet 1340 using a DSL, cable or other suitable interface 1311; the femto-cell modem 1320, configured to provide communication services to the multiplicity of mobile terminals within the femto-cell coverage area localized to the home and it's immediate vicinity using cellular radio interface 1321, compatible with the macro-cellular RF interface; and one or more short range wireless modems 1330, with one or more wireless interfaces 1331—such as: 802.11, Bluetooth, ZigBee, etc., suitable to connect with the "smart appliances".

Figure 14:
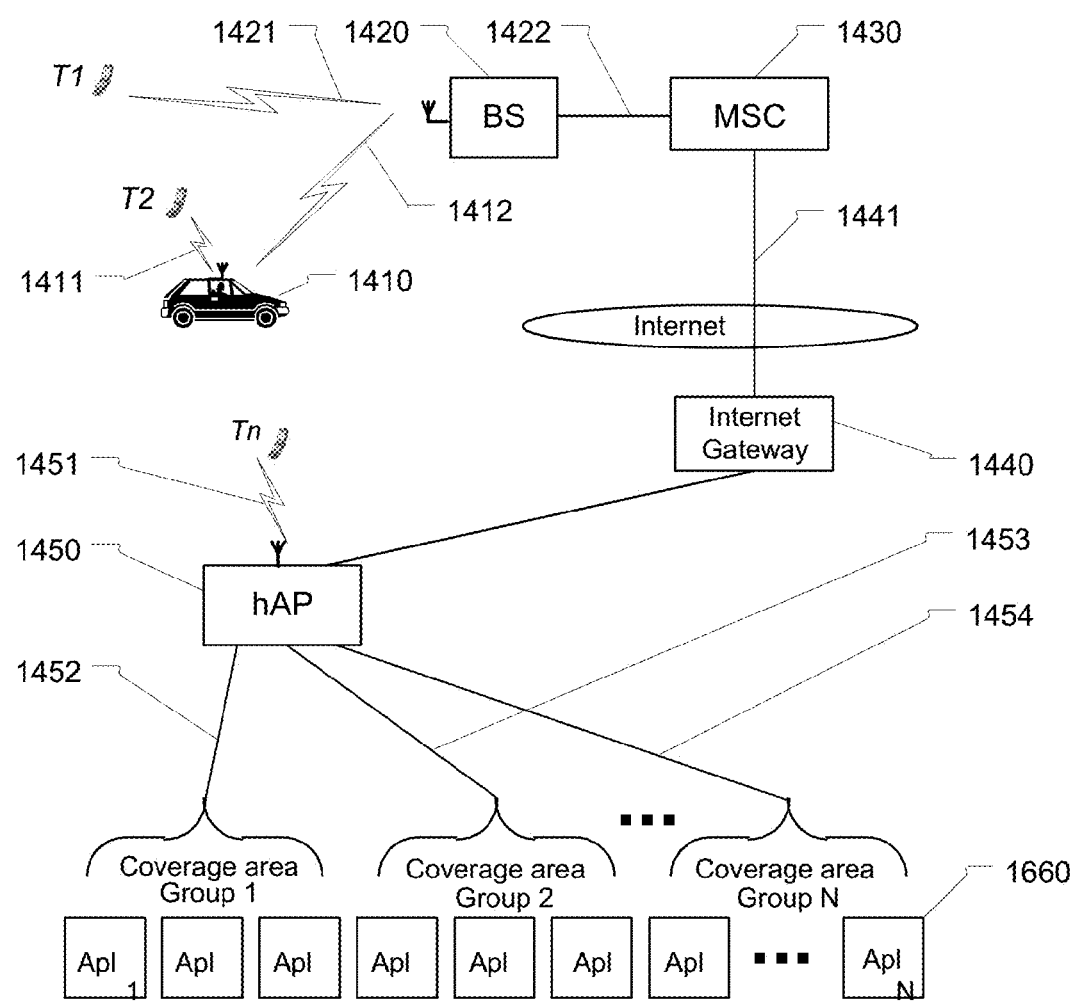
FIG. 14 presents architecture of integrated mobile and home appliance network.

The interfaces, connectivity and topology of mobile femto-cell integrated into the home appliance network are depicted in FIG. 14. When the authorized user mobile terminal is in the vicinity or inside the vehicle or home, the localized communication is provided over the mAP or hAP RF interface 1411 and 1451 respectively. When the authorized user enters the vehicle, the service provided in the mAP 1410, coverage area on the RF interface 1411 is routed to the macro-cell 1420, on the mAP RF interface 1412 then using the macro-cell backhaul interface 1422 through the mobile switching center (MSC) 1430, to the intended destination. When the authorized user enters the home, the service provided in the hAP 1450, coverage area on the RF interface 1451 is routed to the MSC 1430, through the Internet gateway 1440 and suitable Internet interface 1441, to the intended destination.

The hAP 1450 with it's wireless interfaces 1452, 1453, 1454, and the "smart appliances" 1460, connected through said interfaces to the hAP constitute a home appliance network. The interface 1452 . . . 1454, may consist of a variety of short range RF interfaces operating in an unlicensed spectrum and suitable to connect appliances with various requirements (data rates, etc.) and at various distances from the hAP, such as: RF IEEE 802.11, Bluetooth, ZigBee, ANT, etc.

In addition to carrying the user communication, the mAP ⇔ macro-cell ⇔ hAP interface carry an in-band messages between the mAP and hAN, connecting the vehicle and it's authorized occupants with the home appliances, does integrating the "smart home" and with the mobile user.

Figure 15:
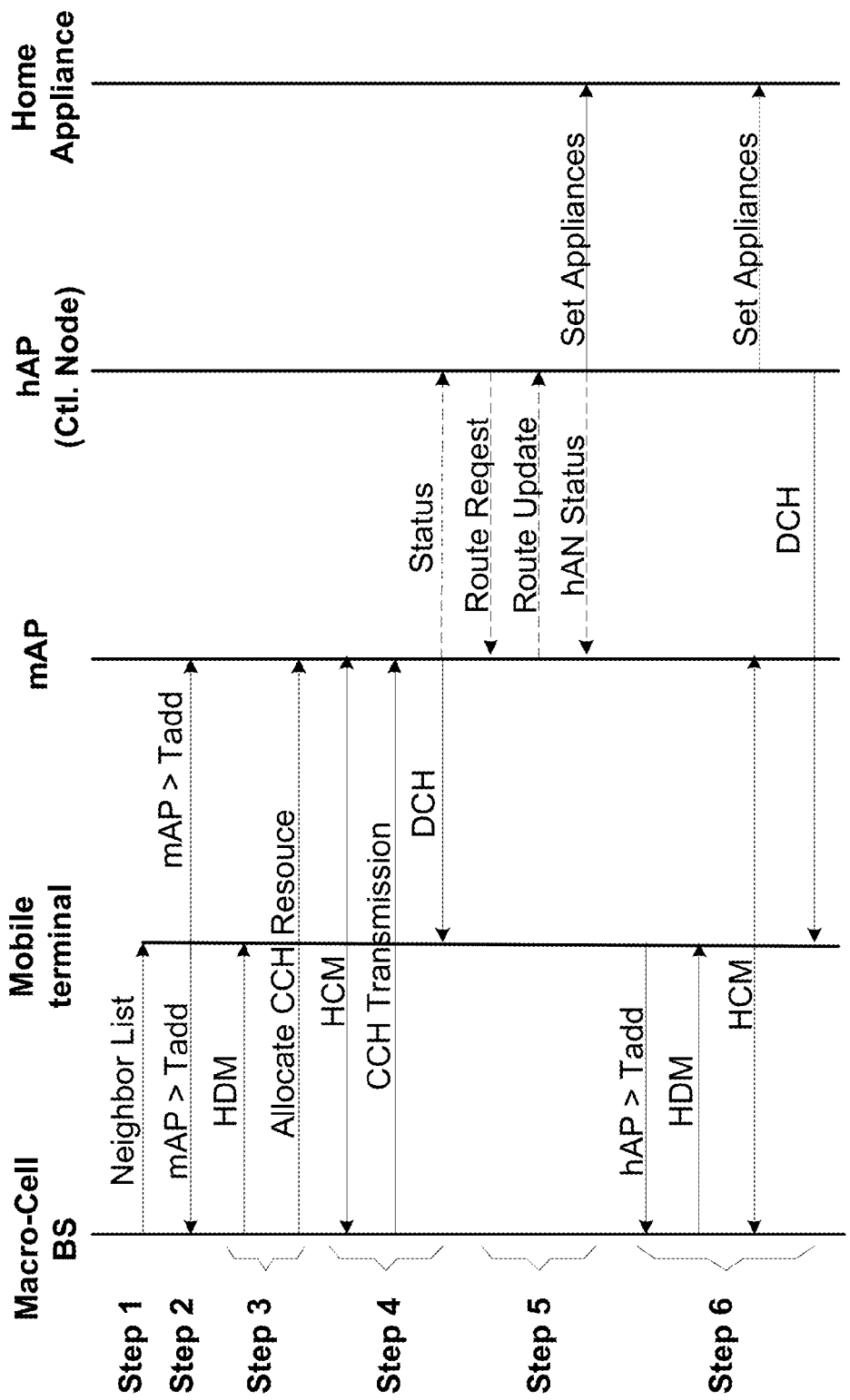
FIG. 15 presents a message/control flow between the macro-cell, mobile terminal, mAP and the hAP/hANet Control Node.

The benefits of such integration will become obvious from the following example presented in FIG. 14 and FIG. 15:

In Step 1 of FIG. 15, the mAP and the hAP is added to the user mobile terminal Neighbor List, which triggers a periodic search of those femto-cells;

At time T1 of FIG. 14, the user mobile terminal is in communication with the macro-cell bases station 1420, as it transitions from macro-cell environment, for example: office, home, store to a vehicle equipped with a mAP.

When the user mobile terminal is in the coverage area of mAP—time T2 in FIG. 14, the signal strength of the mAP is above the $T_{ADD}$ threshold (Step 2 of FIG. 15), and in Step 3 the macro-cell sends a Handoff Direction Message adding the mAP to the authorized user mobile terminal Active Set, while also allocating resources for the user mobile terminal ID to the Common Channel (1412, FIG. 14). of mAP secondary RF interface.

In Step 4 of FIG. 15, both the mAP and the macro-cell receive a Handoff Complete Message (HCM), at which time the macro-cell BS terminates transmission to this mobile terminal on it's Dedicated Channel resources and adds said user traffic into a multi-user packets transmitted on the mAP secondary RF interface Common Channel 1412 (CCH). The user packets are extracted from the multi-user packets by the mAP MAC Layer and transmitted on the Dedicated Channel (DCH) of the primary RF interface 1611. At this time, mobile terminal's transmission power is controlled by the mAP irrespective of the relative strength of the signals received form the macro-cell, does guaranteeing stability of the power control loop. Now, mAP sends an in-band status message indicating presence of this user inside the vehicle and requests status of the hAN network.

In response to the status message informing the user presence in the vehicle, in Step 5, the hAP sends an in-band route update request message requesting an update of the vehicle position and it's route, and depending on the user profile, time of the day and the preferential set-points of various home appliances, the hAP sends an appropriate control messages to the selected home appliances. When the mAP receives the route update request message it will retrieve the related parameters from the vehicle navigation system. The route update request message may be accompanied be multiplicity of messages requesting an updates of various vehicle and mobile terminal parameters such as: battery status of the electric vehicle; reading of health monitoring sensors controlled by the user mobile terminal, etc. The route update and the other status update messages may be send periodically depending on the current time and the vehicle current position, as the user may take a different rout, or stop at different places on his journey home. As such the procedures described in Step 2 through 5 may repeat for up to $T_{n-1}$ times.

At time Tn of FIG. 14, the mAP arrives at the user home and the user mobile terminal leaves the coverage area of the mAP, which is Step 6 of FIG. 15, when the user mobile terminal reports the signal strength of the hAP exceeds the $T_{ADD}$ threshold and receives an HDM. When both the macro-cell and the hAP receives a HCM, the transmission on the macro-cell DCH is discontinued and "moved" to the hAP Internet interface 1441, then transmitted to the user on the hAP primary RF interface. Now, the user mobile terminal's transmission power is controlled by the hAP irrespective of the relative strength of the signals received form the macro-cell, does guaranteeing stability of the power control loop. When the hAP receives the HCM, it will execute the hAN control procedures associate with the dedicated users presence status. Such procedures among the others may include: preferred setting of the rooms temperature and lighting; stetting up preferred TV channel; dispensing of the daily medication; staring a Jacuzzi, etc, etc.

From the above example, one skilled in art will appreciate the benefits provided by integration of mobile femto-cell with the home femto-cell and the home appliance network. Such integration allows for an endless opportunity to not only optimize the functionality, and power consumption of the "smart home", but also to change dynamically the behavior of such smart home without the user direct involvement but rather automatically, based on the user current location and activities.

To visualize the difference between home appliance network integrated with the mobile femto-cell and one without such integration, lets evaluate an example in which at time of arrival, the selected user preferences for setup of various home parameters are as follows:

a) rooms temperature=74 deg. F.;
b) pathway, leaving room, kitchen, den lights=ON;
c) TV=News & channel N;
d) coffee maker=ON, Cappuccino
e) Jacuzzi at 90 deg. F. in 30 min.

Without integration of mAP into the home appliance network, the user has only two options—each at best suboptimal.

Option 1; preset time the selected appliance will be turned on—a highly inefficient option as the user arrival may be delayed by various circumstances so setting items a through c provide no befits (actually loss), setting items d and e is either impassible or dangerous.

Option 2; the user controls the home appliance network from his smart-phone. Here, the user may access the home appliance network (or individual appliances) at any time, however, such process requires constant attention and unnecessary distraction from driving, etc. Let assume the "normal" time the user arrives home about 5:50 PM and his profile for 6:00 PM is a follows: room temperature=74 F; News at 6 and Cappuccino; Jacuzzi at 6:35 T=112 F. However, his office meeting extended to 6:40 and he has to go to the bank and store on the way home. He can't (or forgets) to change the home appliance setup time, so the lights are ON and the News at 6 is playing to the empty room—he most likely would not dear to preset the coffee maker and Jacuzzi remotely.

Also it is possible that the user may log to his home appliance network during a meeting, or on his travel back home, however this may be not appreciated by the other attendees, difficult and dangerous during the driving, or impossible—as the user may simple forget during daily activities.

The control tasks for home appliance network become simple and automatic when mAP is integrated to said network, as by closing the communication link with the mAP, the hAN "supervises" the mobility of the user and adjust home appliances according to the user current schedule and his preferences.

In such case, user's deviation for his routine schedule, has no impact on the efficiency of the system, as the home appliance network adaptively adjusts it's behavior to the user current schedule while maintaining the all the appliances at the preferred operating level. So the thermostats, lights, coffee maker and Jacuzzi, etc., remain in the "absent from home" condition regardless of the delay in the departure from the office or the number of stops the user makes on his way home, while the TV will be turned ON at 6 and since the user is not "present", the preferred programming will be recorded for future viewing. And depending on the feedbacks from route update messages, the heating/air-conditioning will be turned ON at the time necessary to bring the home temperature from the current to the desired level, while the coffee maker will be instructed to start the cappuccino when the user arrives at home hi terminal performs handover to the hAP—the light are ON and all home appliances at the preferred operational level.

Skilled in art will appreciate of the flexibility, efficiency and endless possibilities of such integrated system. For example, there may be a multiplicity of user and a multiplicity of mAP associated with such hAN, with one or more users may prefer similar appliance behavior in one part of the home while different in another part of the home, while at the same time have different and frequently changing schedules. In such case, the hAN controller will select the settings of the user who arrived home first, while it may inform him, that the other user is delayed—since the scheduled M2FHO is not received at the anticipated time or that the user took a different route, etc. In such case, after receiving the M2FHO and retrieving the mAP route information, the hAN may inform the other user of the anticipated delay, or pass information about the delay—stop at the bank or grocery store, allowing for a timely interaction—request to purchase additional items, supervision of teenager, etc.

If enabled, the handovers (M2FHO or F2MHO) and route/schedule update messages are sent via in-band signaling between the mAP and the hAP. When the user mobile terminal is in the "present" state (after M2FHO), the message is sent to the IP address associated with the mAP or hAP. When the user mobile terminal status is in the "absent" state (after F2MHO), the messages are sent to the IP address associated with the user mobile terminal.

To provide such functionality, several types of information in the form of lists, tables, parameters, etc. must be stored for the use by various parts of the system. Furthermore, such information must be protected against unauthorized modifications by secure login privileges and passwords.

First such information consisting list of all authorized users mobile terminals, their phone numbers and the IP addresses.

Second such information consists of all mAPs IP addresses.

Third such information contained in the mAP Closed Subscriber Grout defines association among the mobile terminals and the mAP.

Forth such information contains the mAP route and the handover schedule for mobile terminals belonging to it's Closed Subscriber Group.

Fifth such information, contains a list of appliances within the hAN.

Sixth such information contains table associating the user and the appliances set-up parameters.

Seventh such information contains a list of in-band messages and their parameters.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes", "has" or "having" are used in either the detailed description or the claims, such terms are intended to be inclusive in a manner similar to the term "comprising" as "comprising" is interpreted when employed as a transitional word in a claim.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented Those of skill in the art would understand that information and signals may be represented using any of a variety of different technologies and techniques. For example, data, instructions, commands, information, signals, bits, symbols, etc. may be referenced throughout the above description by other means.

Those of skill would further appreciate that the various illustrative logical blocks, modules, and algorithmic steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

We claim:

1. A system providing remote, autonomous control of home appliances connected to a home Appliance Network (hAN) comprising:
    a mobile femto-cell Access Point (mAP) configured to provide localized communication within a vehicle;
    a home femto-cell Access Point (hAP) configured to provide localized communication within a home;
    a multiplicity of home appliances configured as the hAN; and
    wherein upon completion of a handover between a selected user and the mAP, the mAP sends an in-band message to the hAP indicating completion of said handover then periodically sends route information of the mAP to the hAP; and
    wherein upon reception of a handover message from the mAP, the hAP utilizes a hAN controller and estimates a time of arrival of the selected user based on a schedule and the user profile and sends control commands to the plurality of home appliances connected to the hAN which are included in the selected user profile;
    wherein the hAN controller compares vehicle route information obtained from the mAP with the user profile of the selected user and based on the vehicle route information, estimates the time of arrival of the selected user; and adjusts parameters and operation of the multiplicity of home appliances at the time of arrival of the selected user.

2. The system of claim 1, wherein the hAP, performs control function of the hAN.

3. The system of claim 1, wherein the hAN comprises: the multiplicity of home appliances communicating with the hAN utilizing a wireless or wire-line interface.

4. The system of claim 3, wherein the wireless interface comprises: a wireless local area network (WLAN) technology; a wireless personal area network (PAN) technology; or a combination thereof.

5. The system of claim 1, wherein the hAN controller sends in-band messages to the mAP requesting updates of the vehicle route information of the mAP and the selected user handover status information, and then updates status of the multiplicity of the appliances connected to the hAN.

6. A method providing remote, autonomous control of home appliances connected to a home Appliance Network (hAN) comprising of:
    associating an identity of a mobile Aaccess Ppoint (mAP), with a selected user by including the identity of the mAP in a selected user mobile terminal Neighbor List;
    associating an identity of a home Access Point (hAP), with the selected user by including the identity of the hAP in the selected user mobile terminal Neighbor List;
    associating the mAP with the hAN by including the identity of mAP into a hAN control function;
    associating a plurality of appliances connected to the hAN with a schedule and a profile of the selected user;
    monitoring handovers between a mobile terminal of the selected user and the mAP based on the associated identity of the mAP in the selected user mobile terminal Neighbor List; and
    after detecting said handovers, use an in-band message to request information of a mAP route and after comparing the mAP route information with the schedule and the profile of the selected user, sending an updated control information to the plurality of appliances connected to the hAN;
    wherein upon completion of said handovers between the selected user of the mobile terminal and the mAP, an in-band message indicating status of completion of said handover is sent to the hAN;
    wherein upon reception of a handover message from the mAP, estimating, by the hAP, a time of arrival of the selected user and sending control commands to the plurality of the home appliances connected to the hAN which are included in the selected user profile;
    and based on the schedule, the profile of the selected user the route information of the mAP and the estimated time of arrival,
    sending control commands to appliances connected to the hAN; and
    adjusting parameters and operation of the multiplicity of home appliances at the time of arrival of the selected user.

7. The method of claim 6, wherein upon completion of said handovers between the selected user of the mobile terminal and the mAP, an in-band message indicating status of completion of said handover is sent to the hAP.

8. The method of claim 6, wherein upon receiving of the in-band message indicating handover between the selected user of the mobile terminal and the mAP, the hAP notifies the hAN, about said handover.

* * * * *